(12) United States Patent
Moon et al.

(10) Patent No.: US 12,548,611 B2
(45) Date of Patent: Feb. 10, 2026

(54) MEMORY DEVICE USING DATA STROBE SIGNAL AND METHOD FOR COMPENSATING SKEW OF DATA STROBE SIGNAL THEREOF

(71) Applicant: SAMSUNG ELECTRONICS CO., LTD., Suwon-si (KR)

(72) Inventors: Byongmo Moon, Suwon-si (KR); Jeonghyeok You, Seoul (KR); Seong-Ook Jung, Seoul (KR); Ji Young Kim, Seoul (KR); Hohyun Chae, Seoul (KR)

(73) Assignees: SAMSUNG ELECTRONICS CO., LTD., Suwon-si (KR); UIF (University-Industry Foundation) Yonsei University, Seoul (KR)

( * ) Notice: Subject to any disclaimer, the term of this patent is extended or adjusted under 35 U.S.C. 154(b) by 106 days.

(21) Appl. No.: 18/647,853

(22) Filed: Apr. 26, 2024

(65) Prior Publication Data

US 2025/0104751 A1 Mar. 27, 2025

(30) Foreign Application Priority Data

Sep. 26, 2023 (KR) ........................ 10-2023-0129800

(51) Int. Cl.
*G11C 7/10* (2006.01)
*G11C 7/22* (2006.01)
*G11C 29/50* (2006.01)

(52) U.S. Cl.
CPC ............ *G11C 7/222* (2013.01); *G11C 7/1057* (2013.01); *G11C 7/1084* (2013.01);
(Continued)

(58) Field of Classification Search
CPC ................................ G11C 7/1057; G11C 7/10
(Continued)

(56) References Cited

U.S. PATENT DOCUMENTS 8,103,917 B2   1/2012   Jang
10,469,046 B2  11/2019  Celestinos Arroyo
(Continued)

FOREIGN PATENT DOCUMENTS

KR   10-1836510 B1   4/2018
KR   10-2365110 B1   2/2022
(Continued)

OTHER PUBLICATIONS

M. -J. Park et al., "A 192-GB 12-High 896-GB/s HBM3 Dram with a TSV Auto-Calibration Scheme and Machine-Learning-Based Layout Optimization," 2022 IEEE International Solid-State Circuits Conference (ISSCC), Feb. 20, 2022, pp. 444-446, doi: 10.1109/ISSCC42614.2022.9731562.*

(Continued)

*Primary Examiner* — Muna A Techane
(74) *Attorney, Agent, or Firm* — Sughrue Mion, PLLC

(57) ABSTRACT

A memory device includes core dies including memory cell arrays, and a buffer die electrically connected to the core dies through one or more through silicon vias. The buffer die includes a DQS generation circuit that receives an external clock signal from an external device and generates data strobe signals based on the external clock signal for communicating data with the core dies, a DQS calibration circuit that detects a latency of each of plural rank signal that are received from the core dies based on the data strobe signals, respectively, and a coefficient decision circuit that detects a threshold voltage code of the buffer die, applies a weight to the latency of each rank signal based on the threshold voltage code to generate a weighted calibration code for each rank signal, and transmits the weighted calibration codes to respective ones of the core dies.

20 Claims, 20 Drawing Sheets

(52) U.S. Cl.
CPC .. *G11C 29/50004* (2013.01); *G11C 29/50012* (2013.01); *G11C 2029/5004* (2013.01); *G11C 2207/2254* (2013.01)

(58) Field of Classification Search
USPC .......................................................... 365/193
See application file for complete search history.

(56) References Cited

U.S. PATENT DOCUMENTS

| | | | |
|---|---|---|---|
| 10,482,937 | B2 | 11/2019 | Lee et al. |
| 10,824,575 | B2* | 11/2020 | Lee ...................... G06F 3/0659 |
| 11,699,472 | B2 | 7/2023 | Yoon et al. |
| 2004/0022311 | A1* | 2/2004 | Zerbe ................ H04L 25/03057 |
| | | | 375/229 |
| 2018/0294999 | A1* | 10/2018 | Giovannini ........... G06F 3/0673 |
| 2020/0411132 | A1* | 12/2020 | Hulton .................. G06F 3/0679 |
| 2022/0059154 | A1* | 2/2022 | Nikoukary ........... G11C 7/1093 |
| 2023/0162780 | A1 | 5/2023 | Chadha et al. |

FOREIGN PATENT DOCUMENTS

| | | |
|---|---|---|
| KR | 10-2022-0145009 A | 10/2022 |
| KR | 10-2493268 B1 | 1/2023 |
| KR | 10-2499037 B1 | 2/2023 |
| KR | 10-2023-0031577 A | 3/2023 |

OTHER PUBLICATIONS

S. -B. Lim, H. -W. Lee, J. Song and C. Kim, "A 247 uW 800 Mb/s/pin DLL-Based Data Self-Aligner for Through Silicon via (TSV) Interface," in IEEE Journal of Solid-State Circuits, vol. 48, No. 3, pp. 711-723, Mar. 2013, doi: 10.1109/JSSC.2013.2242251.*

* cited by examiner

FIG. 12

|  | SS | TT | FF |
|---|---|---|---|
| P<0:2> | 111 | 100 | 000 |
| N<0:2> | 111 | 100 | 000 |
| Weigting | X2.35 | X1.50 | X1.00 |

MEMORY DEVICE USING DATA STROBE SIGNAL AND METHOD FOR COMPENSATING SKEW OF DATA STROBE SIGNAL THEREOF

CROSS-REFERENCE TO RELATED APPLICATIONS

This application claims priority under 35 U.S.C. § 119 to Korean Patent Application No. 10-2023-0129800 filed on Sep. 26, 2023, in the Korean Intellectual Property Office, the disclosures of which are incorporated by reference herein in their entireties.

BACKGROUND

1. Field

Devices, apparatuses and methods consistent with the present disclosure relate to a semiconductor memory device, and more particularly, relate to a memory device using data strobe signals, and a skew compensation method for the data strobe signals.

2. Description of Related Art

A semiconductor memory may be mainly classified as a volatile memory or a non-volatile memory. Read and write speeds of the volatile memory (for example, a DRAM or an SRAM) are fast, but the data stored in the volatile memory disappear when a power is turned off. In contrast, the non-volatile memory may retain data even when the power is turned off. Therefore, the non-volatile semiconductor memory devices may be used to store contents that must be preserved regardless of whether power is supplied or not.

A development of new IT technologies such as artificial intelligence (AI), big data, or 5G has led to an increase in demand for high-performance, highly integrated memory semiconductors. As a memory bandwidth required by a system increases, memory bottlenecks emerge. To solve this problem, TSV (Trough Silicon Via) I/O technology is used to stack memories in three dimensions, significantly improving integration and a bandwidth. High-Bandwidth Memory (HBM) technology is developed. However, in a process of transmission to a TSV between three-dimensionally stacked memory cores, a specified phase difference of data strobe signals may not be maintained, and a data collision error may occur.

SUMMARY

It is an aspect to provide a memory device that reduces data collisions caused by data strobe signals used in a plurality of core dies by generating a skew calibration code from a buffer die in an integrative manner.

According to an aspect of one or more example embodiments, there is provided a memory device comprising a plurality of core dies including memory cell arrays; and a buffer die electrically connected to the plurality of core dies through at least one through silicon via (TSV). The buffer die comprises a DQS generation circuit configured to receive an external clock signal from an external device and generate a plurality of data strobe signals based on the external clock signal for communicating data with the plurality of core dies; a DQS calibration circuit configured to detect a latency of each of a plurality of rank signals, the plurality of rank signals being received from the plurality of core dies based on the plurality of data strobe signals, respectively; and a coefficient decision circuit configured to detect a threshold voltage code of the buffer die, apply a weight to the latency of each of the plurality of rank signals based on the threshold voltage code to generate a weighted calibration code for each of the plurality of rank signals, and transmit the weighted calibration codes to respective ones of the plurality of core dies.

According to another aspect of one or more example embodiments, there is provided a skew compensation method of a memory device, the skew compensation method comprising transmitting a plurality of rank signals that correspond to a plurality of data strobe signals generated in a buffer die based on an external clock signal received from an external device, from a plurality of core dies to the buffer die through at least one through silicon via (TSV); detecting an order of the plurality of rank signals based on phases of the plurality of rank signals; detecting a latency of each of the plurality of rank signals; generating a weighted calibration code for each of the plurality of core dies, based on a threshold voltage of the buffer die and the latency of each of the plurality of rank signals; and compensating for a skew of the plurality of rank signals of the plurality of core dies based on the weighted calibration codes.

According to yet another aspect of one or more example embodiments, there is provided a memory device comprising a plurality of core dies including memory cell arrays; and a buffer die electrically connected to the plurality of core dies through at least one through silicon via (TSV). The buffer die comprises a DQS generation circuit configured to receive an external clock signal from an external device and generate a plurality of data strobe signals based on the external clock signal for communicating data with the plurality of core dies; a DQS calibration circuit configured to detect a latency of each of a plurality of rank signals, the plurality of rank signals being received from the plurality of core dies based on the plurality of data strobe signals, respectively; and a coefficient decision circuit configured to detect a threshold voltage code of the buffer die, apply a weight to the latency of each of the plurality of rank signals based on the threshold voltage code to generate a weighted calibration code for each of the plurality of rank signals, and transmit the weighted calibration codes to the plurality of core dies. The DQS calibration circuit is configured to generate an error detection feedback signal based on the threshold voltage code, and the DQS generation circuit is configured to correct timing errors of the plurality of data strobe signals based on the error detection feedback signal.

BRIEF DESCRIPTION OF THE FIGURES

The above and other aspects will become apparent by describing in detail embodiments thereof with reference to the accompanying drawings, in which:

FIG. 12 is a table illustrating examples of a threshold voltage code output from a threshold voltage detection circuit of the coefficient decision circuit of FIG. 10 and weight ratios used in weight control circuits of the coefficient decision circuit of FIG. 10, according to example embodiments;

DETAILED DESCRIPTION

Below, various example embodiments will be described in detail and clearly to such an extent that an ordinary one in the art may easily implement the various example embodiments.

Below, a DRAM will be used as an example for illustrating features and functions of various example embodiments. However, other features and performances may be easily understood by a person of ordinary skill in the art from information disclosed herein. The present disclosure may be implemented by other embodiments or may be applied to other embodiments. Further, the detailed description may be modified or changed according to viewpoints and applications without escaping from the scope, spirit, and other objects of the present disclosure.

Figure 1:
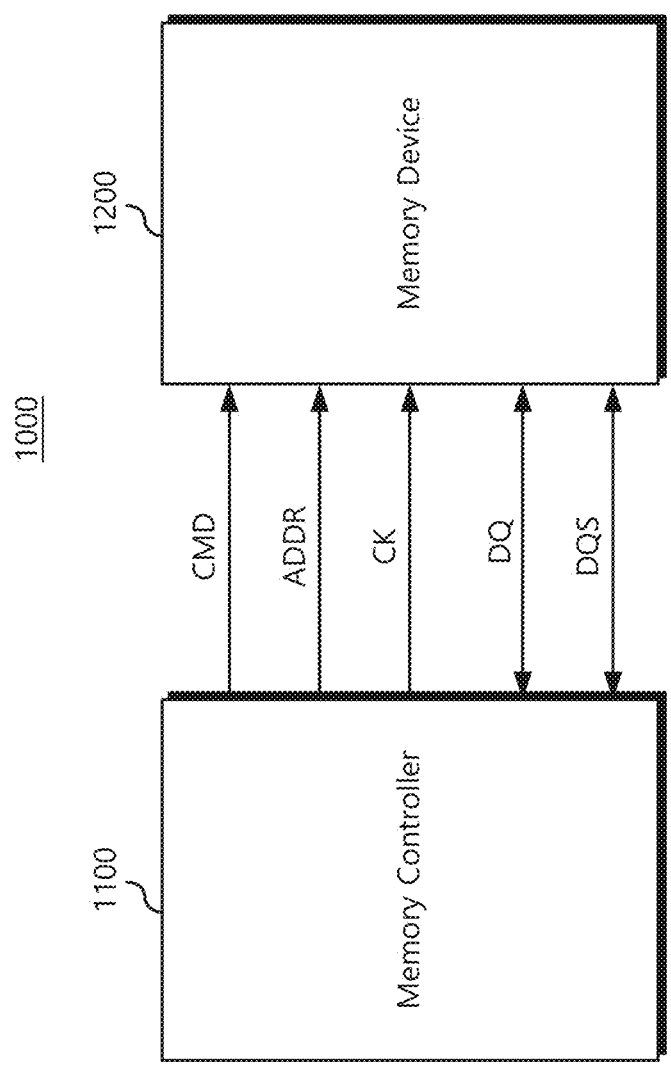
FIG. 1 is a block diagram illustrating a memory system according to an example embodiment.

FIG. 1 is a block diagram illustrating a memory system according to an example embodiment. Referring to FIG. 1, a memory system 1000 may include a memory controller 1100 and a memory device 1200.

According to an example embodiment, the memory controller 1100 may perform an access operation to write data in the memory device 1200 or to read data stored in the memory device 1200. For example, the memory controller 1100 may generate a command CMD and an address ADDR for writing data in the memory device 1200 or reading data stored in the memory device 1200. The memory controller 1100 may include at least one of a system-on-chip (SoC) such as an application processor (AP), a central processing unit (CPU), a digital signal processor (DSP), and a graphics processing unit (GPU).

According to an example embodiment, the memory controller 1100 may provide various signals to the memory device 1200 to control an overall operation of the memory device 1200. For example, the memory controller 1100 may control memory access operations of the memory device 1200 such as a read operation and a write operation. The memory controller 1100 may provide the command CMD and the address ADDR to the memory device 1200 to write data in the memory device 1200 or to read data from the memory device 1200.

According to an example embodiment, the memory controller 1100 may generate various types of commands CMD to control the memory device 1200. For example, the memory controller 1100 may generate a bank request corresponding to a bank operation of changing a state of a memory bank, among memory banks, to read or write data. As an example, the bank request may include an active request for changing a state of a memory bank, among the memory banks, to an active state. The memory device 1200 may activate a row included in the memory bank, for example, a wordline, in response to the active request. The bank request may include a precharge request for changing the memory banks from an active state to a standby state after reading or writing of data is completed.

The memory controller 1100 may generate an input/output (I/O) request (for example, a column address strobe (CAS) request) for the memory device 1200 to perform a read operation or a write operation of data. As an example, the I/O request may include a read request for reading data from activated memory banks. The I/O request may include a write request for writing data in the activated memory banks. The memory controller 1100 may generate a refresh command to control a refresh operation on the memory banks. However, the types of commands CMD described herein are merely exemplary and, in some example embodiments, other types of commands CMD may be present.

According to an example embodiment, the memory device 1200 may output data, requested to be read by the memory controller 1100, to the memory controller 1100 or may store data, requested to be written by the memory controller 1100, in a memory cell of the memory device 1200. The memory device 1200 may input and output data based on the command CMD and the address ADDR. The memory device 1200 may include a plurality of memory banks.

In some example embodiments, the memory device 1200 may be a volatile memory device such as a dynamic random access memory (DRAM), a synchronous dynamic random access memory (SDRAM), a double data rate (DDR) DRAM, a DDR SDRAM, a low-power double data rate (LPDDR) SDRAM, a graphics double data rate (GDDR) SDRAM, a Rambus dynamic random access memory (RDRAM), and a static random access memory (SRAM), or the like. In some example embodiments, the memory device 1200 may be implemented as a nonvolatile memory device such as a resistive RAM (RRAM), a phase change memory (PRAM), a magnetoresistive memory (MRAM), a ferroelectric memory (FRAM), a spin-transfer torque RAM (STT-RAM), or the like. In the present specification, the advantages of the present disclosure have been described with respect to a DRAM by way of example, but example embodiments are not limited thereto.

According to an example embodiment, the memory device 1200 may include a memory cell array divided in units of memory banks, a row decoder, a column decoder, a sense amplifier, a write driver, or the like. The memory banks may store data, requested to be written in the memory device 1200, through the write driver and may read data, requested to be read, using the sense amplifier. The memory device 1200 may further include a component for a refresh operation of storing and maintaining data in the cell array, or select circuits based on an address.

According to an example embodiment, the memory controller 1100 may provide a system clock signal CK to the memory device 1200. The memory device 1200 may generate a plurality of internal clock signals based on the system clock signal CK. The memory controller 1100 and the memory device 1200 may exchange data input/output signals DQ and data strobe signals DQS. During a write operation, the memory controller 1100 may transmit data input/output signals DQ and data strobe signals DQS to the memory device 1200. During a read operation, the memory device 1200 may transmit data input/output signals DQ and data strobe signals DQS to the memory controller 1100. Data strobe signals DQS may be used to sample the data input/output signals DQ.

Figure 2:
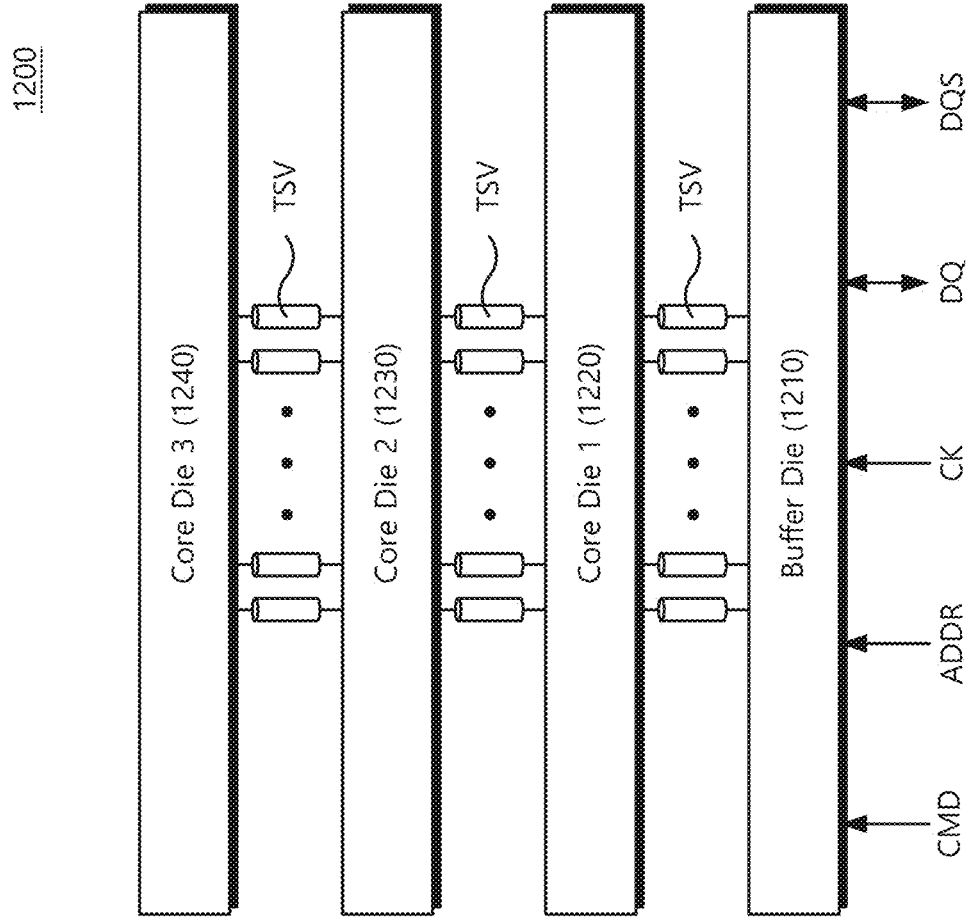
FIG. 2 is a block diagram illustrating a memory device of the memory system of FIG. 1, according to an example embodiment.

FIG. 2 is a diagram illustrating the memory device 1200 of FIG. 1, according to an example embodiment. Referring to FIG. 2, the memory device 1200 may include a high bandwidth memory (HBM). For example, the memory device 1200 may include a buffer die 1210 (also referred to as a logic die) and a plurality of core dies stacked on the buffer die 1210. As an example, in some example embodiments, the plurality of core dies may include a first core die 1220, a second core die 1230, and/or a third core die 1240. However, the number of core dies illustrated in FIG. 2 is exemplary and, in some example embodiments, the memory device 1200 may include at least two or more core dies.

According to an example embodiment, a plurality of via holes may be formed in each of the buffer die 1210 and the plurality of core dies, and the inside of the via holes may be filled with a through silicon via (TSV) (for example, a through electrode). Accordingly, data may be easily transmitted between the buffer die 1210 and the plurality of core dies through the TSV. In some example embodiments, the memory device 1200 may be, for example, a high-bandwidth memory and may not only enable high-speed data transfer through the TSV but also reduce power consumption. However, due to an increase in a data rate at a data input/output pin, when a phase difference between data strobe signals DQS of the plurality of core dies exceeds a specified phase difference, a data collision may occur. For example, when the phase difference between data strobe signals DQS received at the plurality of core dies exceeds the specified phase difference, a data collision may occur.

Figure 3:
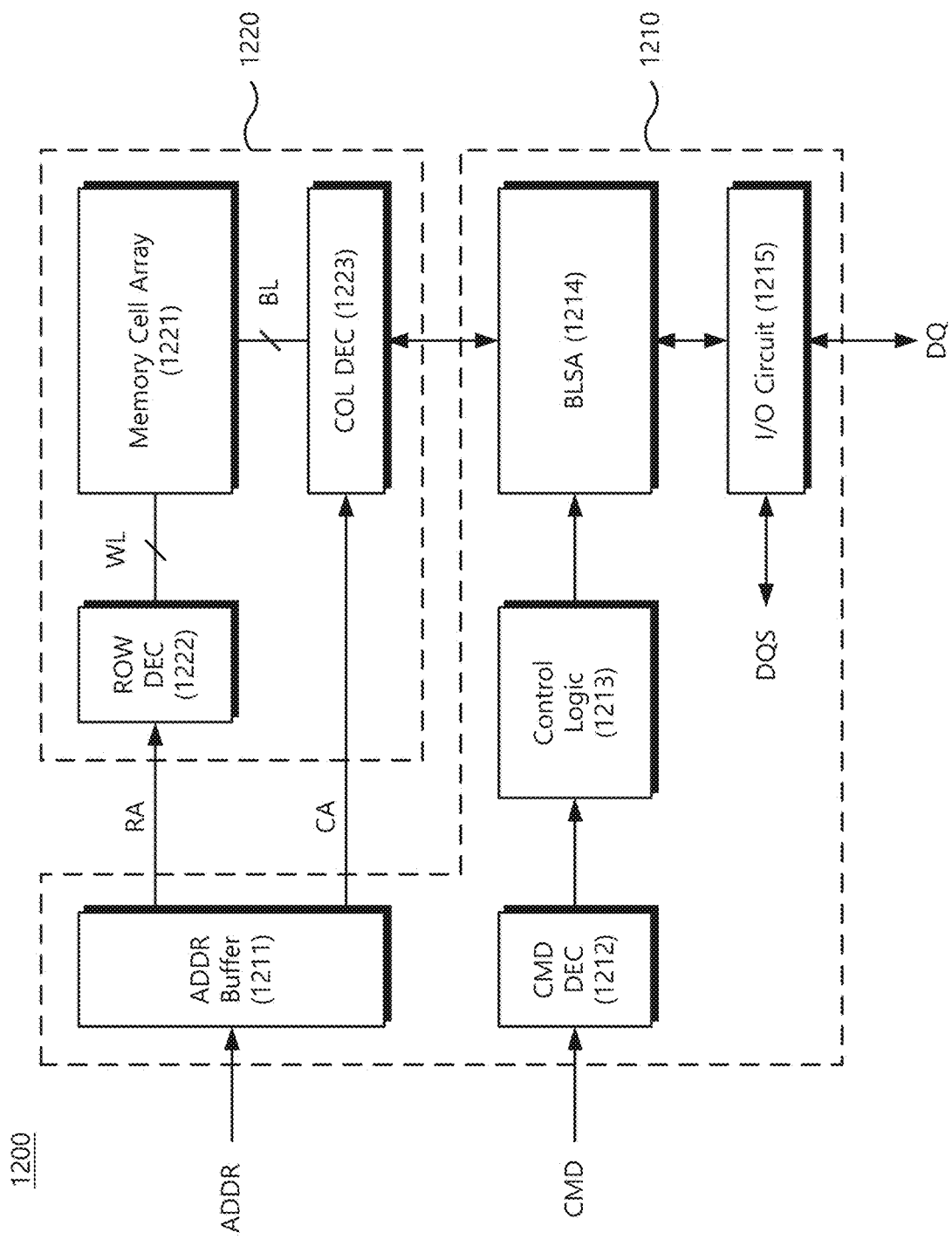
FIG. 3 is a more detailed diagram illustrating the memory device of FIG. 2 in which components included in a buffer die and a first core die of the memory device of FIG. 2 are illustrated, according to an example embodiment.

FIG. 3 is a diagram illustrating components included in the buffer die 1210 and the first core die 1220 of FIG. 2.

Referring to FIG. 3, the buffer die 1210 may include an address (ADDR) buffer 1211, a command (CMD) decoder (DEC) 1212, control logic 1213, a bitline sense amplifier (BLSA) 1214, and an input/output (I/O) circuit 1215. The first core die 1220 may include a memory cell array 1221, a row decoder (ROW DEC) 1222, and a column decoder (COL DEC) 1223. Each of a plurality of core dies may include similar components as those of the first core die 1220 described with respect to FIG. 3 and thus repeated description thereof is omitted for conciseness.

According to an example embodiment, the memory cell array 1221 may include a plurality of memory cells arranged in a matrix of rows and columns. For example, the memory cell array 1221 may include a plurality of wordlines WL and a plurality of bitlines BL connected to the memory cells. The plurality of wordlines WL may be connected to rows of the memory cells, and the plurality of bitlines BL may be connected to columns of the memory cells.

According to an example embodiment, the address (ADDR) buffer 1211 may receive an address ADDR from the memory controller 1100 of FIG. 1. For example, the address ADDR may include a row address RA for addressing a row of the memory cell array 1221 and a column address CA for addressing a column of the memory cell array 1221. The address buffer 1211 may transmit the row address RA to the row decoder 1222 and may transmit the column address CA to the column decoder 1223.

According to an example embodiment, the row decoder (ROW DEC) 1222 may select one of the plurality of wordlines WL connected to the memory cell array 1221. The row decoder 1222 may decode the row address RA, received from the address buffer 1211, to select a single wordline corresponding to the row address RA and may activate the selected wordline.

According to an example embodiment, the column decoder (COL DEC) 1223 may select a predetermined bitline from among the plurality of bitlines BL of the memory cell array 1221. The column decoder 1223 may decode the column address CA, received from the address buffer 1211, to select the predetermined bitline corresponding to the column address CA.

According to an example embodiment, the bitline sense amplifier (BLSA) 1214 may be connected to the bitlines BL of the memory cell array 1221. For example, the bitline sense amplifier 1214 may sense a change in voltage of a selected bitline, among the plurality of bitlines BL, and may amplify and output the change in voltage.

According to an example embodiment, the command CMD may include a write enable signal, a row address strobe signal, a column address strobe signal, and/or a chip select signal. According to an example embodiment, the command decoder (CMD DEC) 1212 may decode the write enable signal, the row address strobe signal, the column address strobe signal, and the chip select signal received from the memory controller 1100 and provide the control signals corresponding to the command CMD to the control logic 1213. In some example embodiments, the command CMD may include an active request, a read request, a write request, and/or a precharge request.

The control logic 1213 may control an overall operation of the bitline sense amplifier 1214 through the control signals corresponding to the command CMD. The control logic 1213 may control an overall operation of the memory device 1200.

According to an example embodiment, the input/output (I/O) circuit 1215 may exchange data input/output signals DQ, which are output based on a sensed and amplified voltage from the bitline sense amplifier 1214, with the memory controller 1100 based on data strobe signals DQS. For example, in some example embodiments, the input/output circuit 1215 may include an input buffer and/or an output buffer. In some example embodiments, the input buffer and/or the output buffer may be connected to a data pad. In some example embodiments, the input/output circuit 1215 may perform a serialization or parallelization operation of data.

Figure 4:
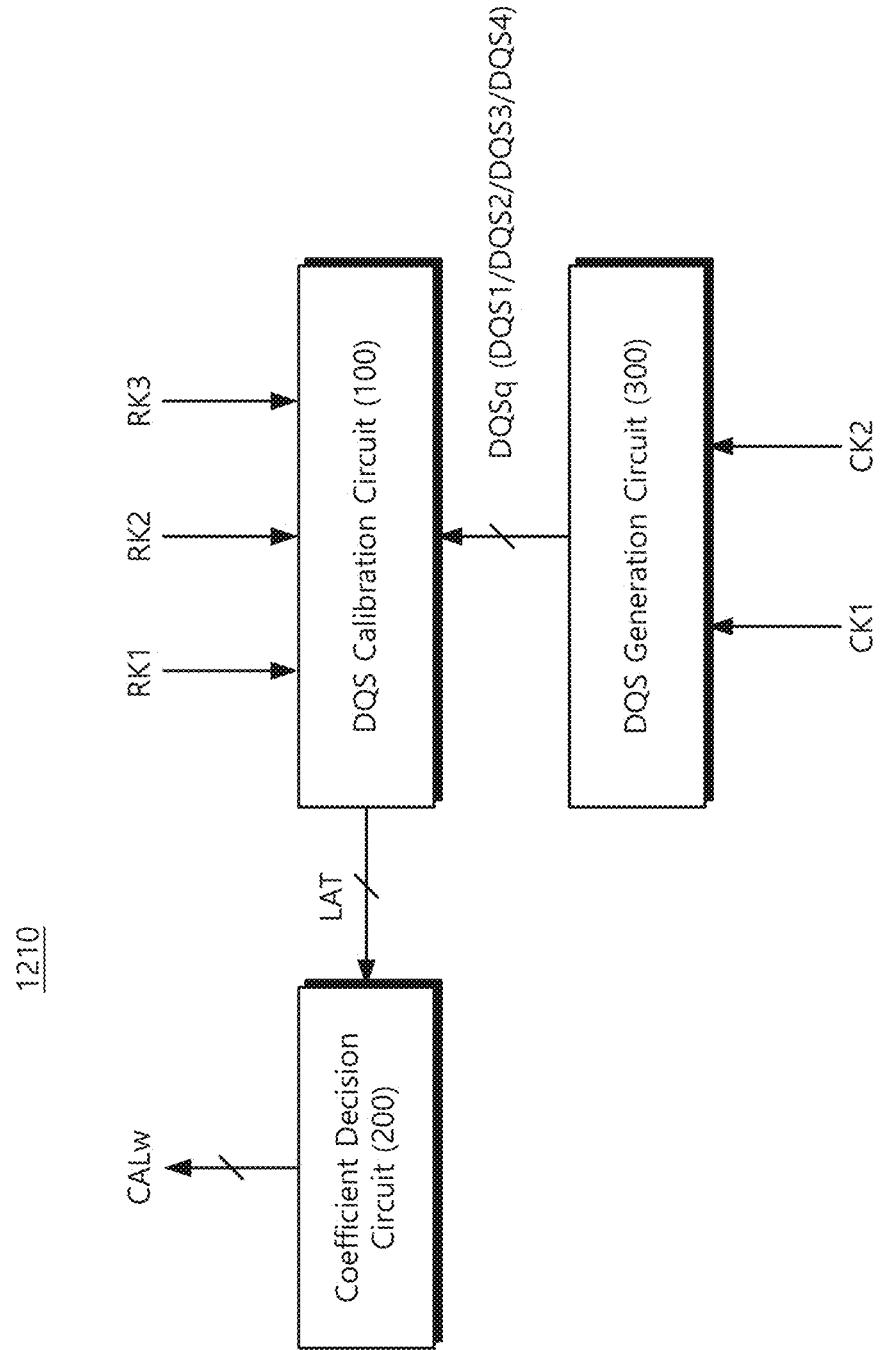
FIG. 4 is a diagram illustrating circuits included in a buffer die of the memory device of FIG. 2, according to an example embodiment.
Figure 5:
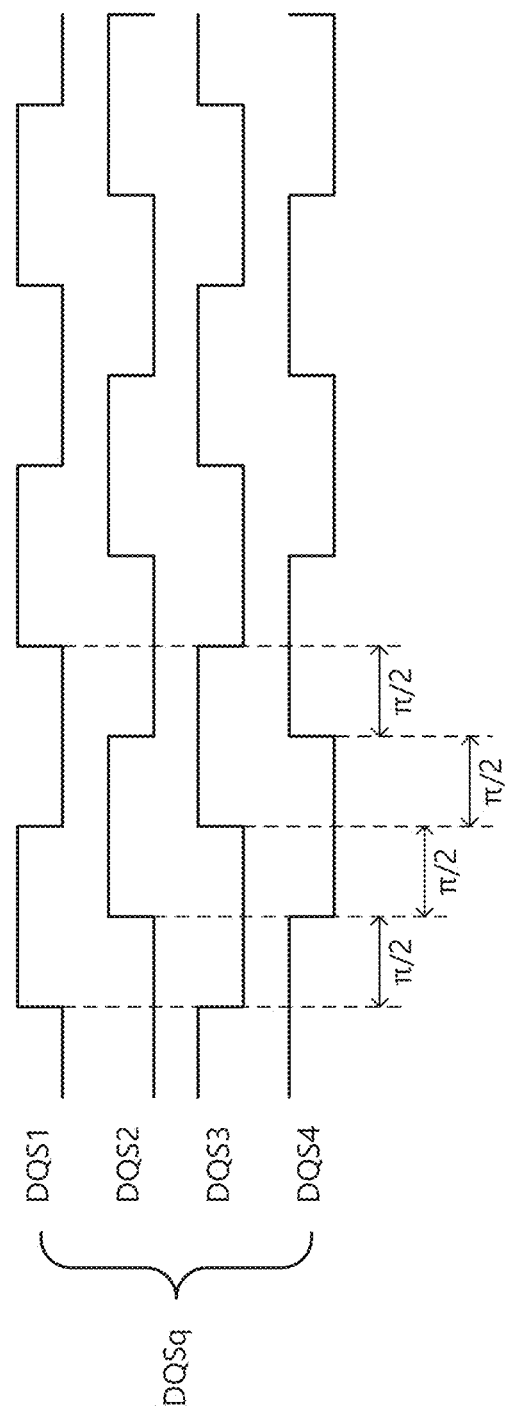
FIG. 5 is a timing diagram illustrating examples of data strobe signals used in the memory device of FIG. 2, according to an example embodiment.

FIG. 4 is a diagram illustrating circuits included in the buffer die 1210 of FIG. 2, according to an example embodiment. FIG. 5 is a timing diagram illustrating examples of data strobe signals used in a memory device of FIG. 2, according to an example embodiment. Referring to FIG. 4, the buffer die 1210 may include a DQS calibration circuit 100, a coefficient decision circuit 200, and a DQS generation circuit 300.

According to an example embodiment, the DQS calibration circuit 100 may receive rank signals (also referred to as data strobe signals) from each of the plurality of core dies of FIG. 2 through at least one TSV. For example, in some example embodiments, the DQS calibration circuit 100 may receive a first rank signal RK1 from the first core die 1220 through a first TSV. The DQS calibration circuit 100 may receive a second rank signal RK2 from the second core die 1230 through a second TSV. The DQS calibration circuit 100 may receive a third rank signal RK3 from the third core die 1240 through a third TSV.

According to an example embodiment, the DQS calibration circuit 100 may detect latency LAT of each of the rank signals (for example, the first rank signal RK1, the second rank signal RK2, and the third rank signal RK3) of the plurality of core dies. The coefficient decision circuit 200 may receive the latencies LAT from the DQS calibration circuit 100 and generate a weighted calibration code CALw for each of the plurality of rank signals based on the latencies LAT, respectively. The weighted calibration codes CALw may be transmitted to the plurality of core dies and be used to compensate for a skew between the data strobe signals of the core dies.

According to an example embodiment, the DQS generation circuit 300 may receive a first clock signal CK1 and a second clock signal CK2 which have different phases from the memory controller 1100 of FIG. 1. The DQS generation circuit 300 may generate a plurality of data strobe signals based on the first clock signal CK1 and the second clock signal CK2. For example, in some example embodiments, the plurality of data strobe signals may be quadrature data strobe signals DQSq, in which case the quadrature data strobe signals DQSq may include a first strobe signal DQS1, a second strobe signal DQS2, a third strobe signal DQS3, and a fourth strobe signal DQS4. However, quadrature data strobe signals are only an example and, in some example embodiments, more of fewer data strobe signals may be used.

Referring to FIG. 5, the quadrature data strobe signals DQSq may have a phase difference of 90 degrees from each other. For example, the first strobe signal DQS1 may have a phase difference of 90 degrees from the second strobe signal DQS2. The second strobe signal DQS2 may have a phase difference of 90 degrees from the third strobe signal DQS3. The third strobe signal DQS3 may have a phase difference of 90 degrees from the fourth strobe signal DQS4. The fourth strobe signal DQS4 may have a phase difference of 90 degrees from the first strobe signal DQS1.

Figure 6:
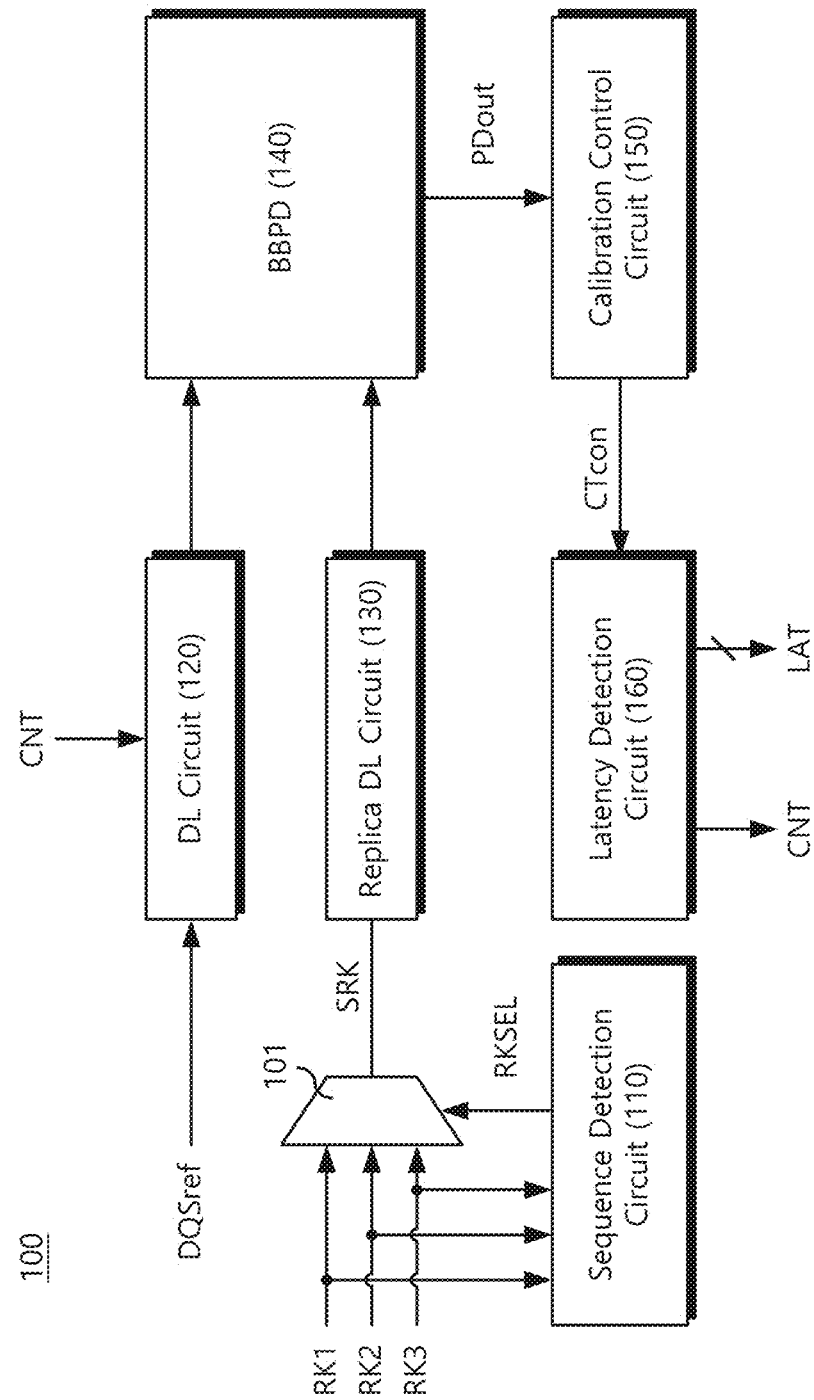
FIG. 6 is a diagram illustrating an example of a DQS calibration circuit of the circuits of FIG. 4, according to an example embodiment.

FIG. 6 is a diagram illustrating an example of the DQS calibration circuit 100 of FIG. 4, according to an example embodiment. Referring to FIGS. 4 and 6, the DQS calibration circuit 100 may include a multiplexer 101, a sequence detection circuit 110, a delay line (DL) circuit 120, a replica delay line (DL) circuit 130, a bang-bang phase detector (BBPD) 140, a calibration control circuit 150, and a latency detection circuit 160.

According to an example embodiment, the sequence detection circuit 110 may detect an order of the rank signals (for example, the first rank signal RK1, the second rank signal RK2, and the third rank signal RK3) of the plurality of core dies. For example, the sequence detection circuit 110 may compare phases of the first rank signal RK1, the second rank signal RK2, and the third rank signal RK3 to generate a rank selection signal RKSEL based on the order of the first rank signal RK1, the second rank signal RK2, and the third rank signal RK3.

According to an example embodiment, the multiplexer 101 may output a selected rank signal SRK that is selected in order of rapid phase among the first rank signal RK1, the second rank signal RK2, and the third rank signal RK3 based on the rank selection signal RKSEL. For example, the rank selection signal RKSEL may include 2 bits. When the rank selection signal RKSEL is '01', the multiplexer 101 may output a rank signal with the fastest phase. When the rank selection signal RKSEL is '10', the multiplexer 101 may output a rank signal with an intermediate phase. When the rank selection signal RKSEL is '11', the multiplexer 101 may output a rank signal with the slowest phase.

According to an example embodiment, the delay line (DL) circuit 120 may receive a reference strobe signal DQSref and delay the reference strobe signal DQSref by a specified amount. The delay line circuit 120 may adjust a delay amount based on a count value CNT. As the count value CNT increases, the delay line circuit 120 may delay the reference strobe signal DQSref more. As an example, in some example embodiments, the reference strobe signal DQSref may be set to one of the first strobe signal DQS1, the second strobe signal DQS2, the third strobe signal DQS3, and the fourth strobe signal DQS1 generated by the DQS generation circuit 300 of FIG. 4. In some example embodiments, a complementary signal of the first strobe signal DQS1 may be set as the reference strobe signal DQSref.

According to an example embodiment, the replica delay line (DL) circuit 130 may have a same delay amount as the delay amount of the delay line circuit 120. In some example embodiments, the replica delay line circuit 130 may have a delay amount that corresponds to the delay amount when the delay line circuit 120 has 0 input as the count value CNT. In some example embodiments, the replica delay line circuit 130 may delay the selected rank signal SRK by a specified amount.

According to an example embodiment, the bang-bang phase detector 140 may compare a phase of a signal output by the delay line circuit 120 with a phase of a signal output by the replica delay line circuit 130, and output a phase detection signal PDout according to the comparison result. For example, when the phase of the signal output by the delay line circuit 120 is faster than the phase of the signal output by the replica delay line circuit 130, the phase detection signal PDout may be at a first level (for example, a low level or logic 0). When the phase of the signal output by the delay line circuit 120 is slower than or equal to the phase of the signal output by the replica delay line circuit 130, the phase detection signal PDout may be at a second level (for example, a high level or logic 1).

According to an example embodiment, the calibration control circuit 150 may generate the count control signal CTcon based on the phase detection signal PDout. For example, when the phase detection signal PDout is at the first level, the count control signal CTcon may be at the first level. When the phase detection signal PDout is at the second level, the count control signal CTcon may be at the second level.

According to an example embodiment, the latency detection circuit 160 may output the count value CNT and/or the latency LAT based on the count control signal CTcon. For example, when the count control signal CTcon is at the first level, the latency detection circuit 160 may increase the count value CNT by a specified amount (for example, by 1). When the count control signal CTcon is at the second level, the latency detection circuit 160 may store and output the latency LAT. However, the specified amount is only an example and, in some example embodiments, the specified amount may be more than 1.

According to an example embodiment, the first rank signal RK1, the second rank signal RK2, and the third rank signal RK3 may be input as the selected rank signal SRK to the replica delay line circuit 130 in rapid order based on the rank selection signal RKSEL. The reference strobe signal DQSref may be input to the delay line circuit 120. The count value CNT may initially be set to 0.

According to an example embodiment, the bang-bang phase detector 140 may compare the phase of the signal output by the delay line circuit 120 with the phase of the signal output by the replica delay line circuit 130. When the phase of the signal output by the delay line circuit 120 is faster than the phase of the signal output by the replica delay line circuit 130, the bang-bang phase detector 140 may output the first level as the phase detection signal PDout. The latency detection circuit 160 may increase the count value CNT until the phase of the signal output by the delay line circuit 120 and the phase of the signal output by the replica delay line circuit 130 become the same.

According to an example embodiment, when the phase of the signal output by the delay line circuit 120 and the phase of the signal output by the replica delay line circuit 130 are the same, the bang-bang phase detector 140 may output the second level as the phase detection signal PDout. When the phase of the signal output by the delay line circuit 120 and the phase of the signal output by the replica delay line circuit 130 are the same, the latency detection circuit 160 may store the latency LAT at that time as a latency of a core die corresponding to the currently selected rank signal SRK (for example, one of the first rank signal RK1, the second rank signal RK2, and the third rank signal RK3).

According to an example embodiment, the DQS calibration circuit 100 may repeatedly perform the above-described latency detection operation for each of the first rank signal RK1, the second rank signal RK2, and the third rank signal RK3. The DQS calibration circuit 100 may transmit the latency LAT of each of the first to third core dies 1220, 1230, and 1240 measured by the latency detection operation to the coefficient decision circuit 200 (see FIG. 4).

Figure 7:
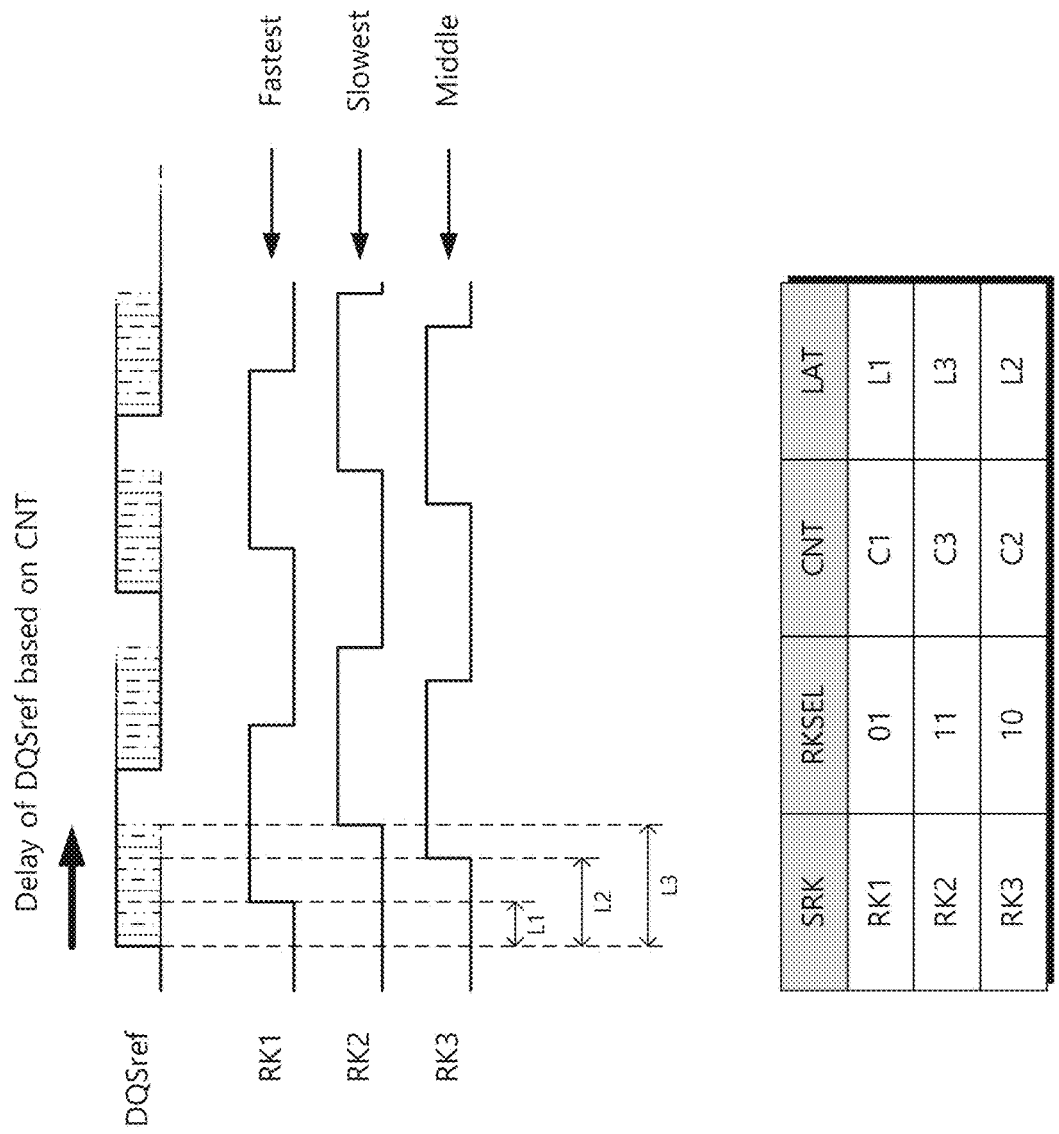
FIG. 7 is a diagram illustrating an example of a latency detection operation of the DQS calibration circuit of FIG. 6, according to an example embodiment.

FIG. 7 is a diagram illustrating an example of the latency detection operation of FIG. 6, according to an example embodiment. Referring to FIGS. 6 and 7, the DQS calibration circuit 100 may receive the second rank signal RK2, and the third rank signal RK3 whose phase is earlier than the second rank signal RK2, and the first rank signal RK1 whose phase is earlier than the third rank signal RK3 from the first to third core dies 1220, 1230, and 1240, respectively. The reference strobe signal DQSref may be set to a data strobe signal whose phase is faster than the first rank signal RK1 among the first strobe signal DQS1, the second strobe signal DQS2, the third strobe signal DQS3, and the fourth strobe signal DQS4.

According to an example embodiment, since the first rank signal RK1 is the fastest among the rank signals, the sequence detection circuit 110 may output '01' as the rank selection signal RKSEL, and the multiplexer 101 may output the first rank signal RK1 as the selected rank signal SRK. The count value CNT may continue to be increased by the operation of the bang-bang phase detector 140, the calibration control circuit 150, and the latency detection circuit 160, described above. The reference strobe signal DQSref may be progressively delayed based on the count value CNT.

According to an example embodiment, when a phase of the reference strobe signal DQSref passing through the delay line circuit 120 and a phase of the first rank signal RK1 passing through the replica delay line circuit 130 are the same, the count value CNT may become a first count C1, and the latency detection circuit 160 may store and output a first latency L1 for the first core die 1220 corresponding to the first rank signal RK1 based on the first count C1.

According to an example embodiment, when the first latency L1 corresponding to the first rank signal RK1 is output, the sequence detection circuit 110 may output '10' as the rank selection signal RKSEL, and the multiplexer 101 may output the third rank signal RK3 as the selected rank signal SRK. The count value CNT may continue to increase by the operation of the bang-bang phase detector 140, the calibration control circuit 150, and the latency detection circuit 160. The reference strobe signal DQSref may be continuously delayed based on the count value CNT.

According to an example embodiment, when the phase of the reference strobe signal DQSref passing through the delay line circuit 120 and a phase of the third rank signal RK3 passing through the replica delay line circuit 130 are the same, the count value CNT may become a second count C2, and the latency detection circuit 160 may store and output a second latency L2 by matching the third core die 1240 corresponding to the third rank signal RK3 based on the second count C2.

According to an example embodiment, when the second latency L2 corresponding to the third rank signal RK3 is output, the sequence detection circuit 110 may output '11' as the rank selection signal RKSEL, and the multiplexer 101 may output the second rank signal RK2 as the selected rank signal SRK. The count value CNT may continue to increase by the bang-bang phase detector 140, the calibration control circuit 150, and the latency detection circuit 160. The reference strobe signal DQSref may be continuously delayed based on the count value CNT.

According to an example embodiment, when the phase of the reference strobe signal DQSref passing through the delay line circuit 120 and a phase of the second rank signal RK2 passing through the replica delay line circuit 130 are the same, the count value CNT may become a third count C3, and the latency detection circuit 160 may store and output a third latency L3 for the second core die 1230 corresponding to the second rank signal RK2 based on the third count C3.

Figure 8:
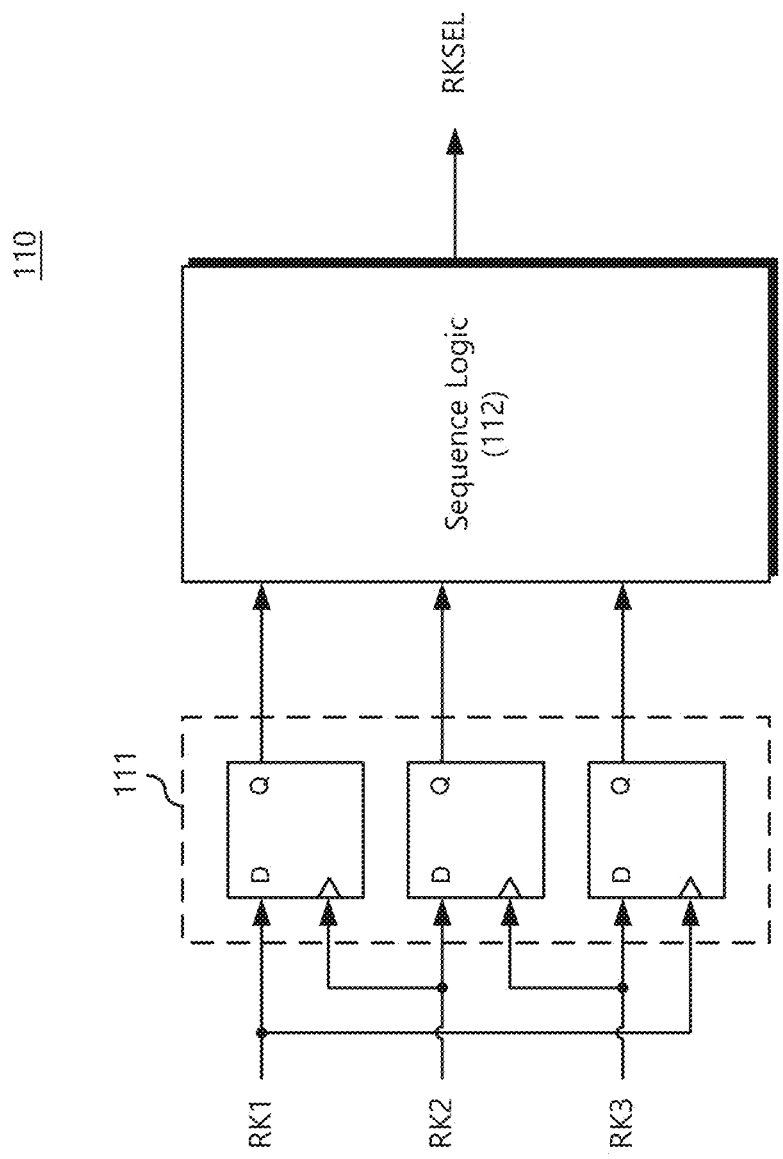
FIG. 8 is a diagram illustrating an example of an sequence detection circuit of the DQS calibration circuit of FIG. 6, according to an example embodiment.

FIG. 8 is a diagram illustrating an example of the sequence detection circuit 110 of FIG. 6, according to an example embodiment. Referring to FIGS. 6 and 8, the sequence detection circuit 110 may include a plurality of flip-flops 111 and sequence logic 112.

According to an example embodiment, each of the first rank signal RK1, the second rank signal RK2, and the third rank signal RK3 may be input to an input terminal of a respective one of the plurality of flip-flops 111. The first rank signal RK1 may be input to a clock terminal of a flip-flop to which the third rank signal RK3 is input to an input terminal. The second rank signal RK2 may be input to a clock terminal of a flip-flop to which the first rank signal RK1 is input to an input terminal. The third rank signal RK3 may be input to a clock terminal of a flip-flop to which the second rank signal RK2 is input to an input terminal.

According to an example embodiment, the sequence logic 112 may receive output signals from each of the plurality of flip-flops 111. The sequence logic 112 may output a rank selection signal RKSEL based on the output signals of the plurality of flip-flops 111. As an example, the rank selection signal RKSEL may include 2 bits. When the rank selection signal RKSEL is '01', the multiplexer 101 may output a rank signal with the fastest phase. When the rank selection signal RKSEL is '10', the multiplexer 101 may output a rank signal with an intermediate phase. When the rank selection signal RKSEL is '11', the multiplexer 101 may output a rank signal with the slowest phase.

Figure 9:
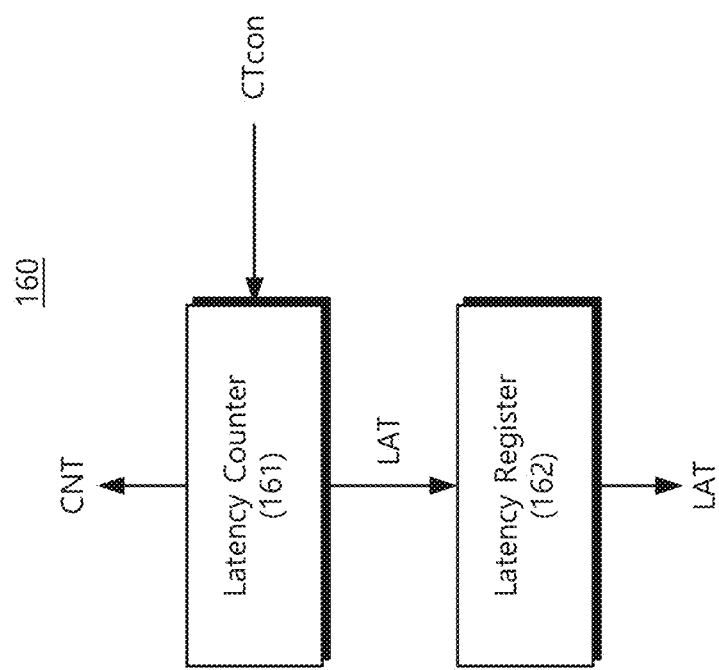
FIG. 9 is a diagram illustrating an example of a latency detection circuit of the DQS calibration circuit of FIG. 6, according to an example embodiment.

FIG. 9 is a diagram illustrating an example of the latency detection circuit 160 of FIG. 6, according to an example embodiment. Referring to FIGS. 6 and 9, the latency detection circuit 160 may include a latency counter 161 and a latency register 162.

According to an example embodiment, the latency counter 161 may receive a count control signal CTcon from the calibration control circuit 150. When the count control signal CTcon is at a first level (for example, a low level or logic 0), the latency counter 161 may increase a count value CNT by a specified amount (for example, 1). When the count control signal CTcon is at a second level (for example, a high level or logic 1), the latency counter 161 may output a latency LAT at that time based on the count value CNT.

According to an example embodiment, the latency register 162 may store the latency LAT received from the latency counter 161. The latency register 162 may store the latency LAT by matching a core die corresponding to the selected rank signal SRK (for example, one of the first rank signal RK1, the second rank signal RK2, and the third rank signal RK3) at the time when the second level as the count control signal CTcon is received.

Figure 10:
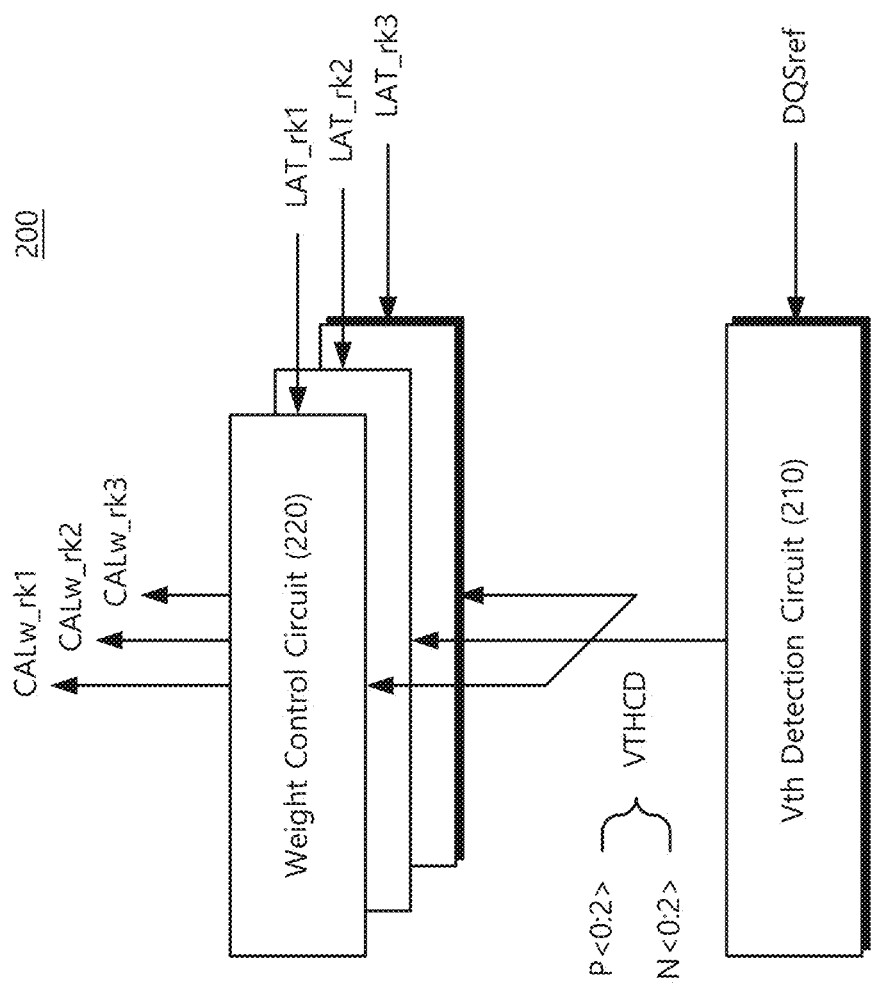
FIG. 10 is a diagram illustrating an example of a coefficient decision circuit of the circuits of FIG. 4, according to an example embodiment.

FIG. 10 is a diagram illustrating an example of the coefficient decision circuit 200 of FIG. 4, according to an example embodiment. Referring to FIG. 10, the coefficient decision circuit 200 may include a threshold voltage (Vth) detection circuit 210 and a plurality of weight control circuits 220. The plurality of weight control circuits 220 may include weight control circuits respectively corresponding to the plurality of core dies, for example, respectively corresponding to the first to third core dies 1220, 1230, and 1240 of FIG. 2. Transistors included in the buffer die 1210 of FIG. 2 may have slightly different threshold voltages depending on a product. The coefficient decision circuit 200 may detect an effect of an average threshold voltage of the transistors included in the buffer die 1210 based on the rank signals and may apply weights to a latency LAT of each core die detected by the DQS calibration circuit 100.

According to an example embodiment, the threshold voltage (Vth) detection circuit 210 may generate a threshold voltage code VTHCD of the buffer die 1210 based on the reference strobe signal DQSref. For example, in FIG. 6, when the average threshold voltage of the transistors included in the buffer die 1210 is greater than a reference voltage, the delay line circuit 120 may have a larger delay width as the count value CNT increases. When the average threshold voltage of the transistors included in the buffer die 1210 is less than the reference voltage, the delay line circuit 120 may have a smaller delay width as the count value CNT increases. Accordingly, the threshold voltage detection circuit 210 may generate the threshold voltage code VTHCD so that a delay width as the count value CNT of the delay line circuit 120 increases may converge on a value when the average threshold voltage of the transistors included in the buffer die 1210 is the reference voltage.

According to an example embodiment, the threshold voltage code VTHCD may include a code corresponding to a P-type transistor (hereinafter referred to as a P code) and a code corresponding to an N-type transistor (hereinafter referred to as a N code). As an example, the threshold voltage code VTHCD may include a 6-bit code. The threshold voltage code VTHCD may include a 3-bit P code (for example, P<0:2>) and a 3-bit N code (for example, N<0:2>).

According to an example embodiment, each of the plurality of weight control circuits 220 may apply a weight according to the threshold voltage code VTHCD to the latency LAT corresponding to a corresponding one of the first to third core dies 1220, 1230, and 1240 to output a weighted calibration code CALw corresponding to one of the first to third core dies 1220, 1230, and 1240. For example, one of the plurality of weight control circuits 220 may apply a weight to a first rank latency LAT_rk1 corresponding to the first rank signal RK1 and transmit a first weighted calibration code CALw_rk1 to the first core die 1220. Another one of the plurality of weight control circuits 220 may apply a weight to a second rank latency LAT_rk2 corresponding to the second rank signal RK2 to transmit a second weighted calibration code CALw_rk2 to the second core die 1230. Yet another one of the plurality of weight control circuits 220 may apply a weight to a third rank latency LAT_rk3 corresponding to the third rank signal RK3 and transmit a third weight calibration code CALw_rk3 to the third core die 1240.

Figure 11:
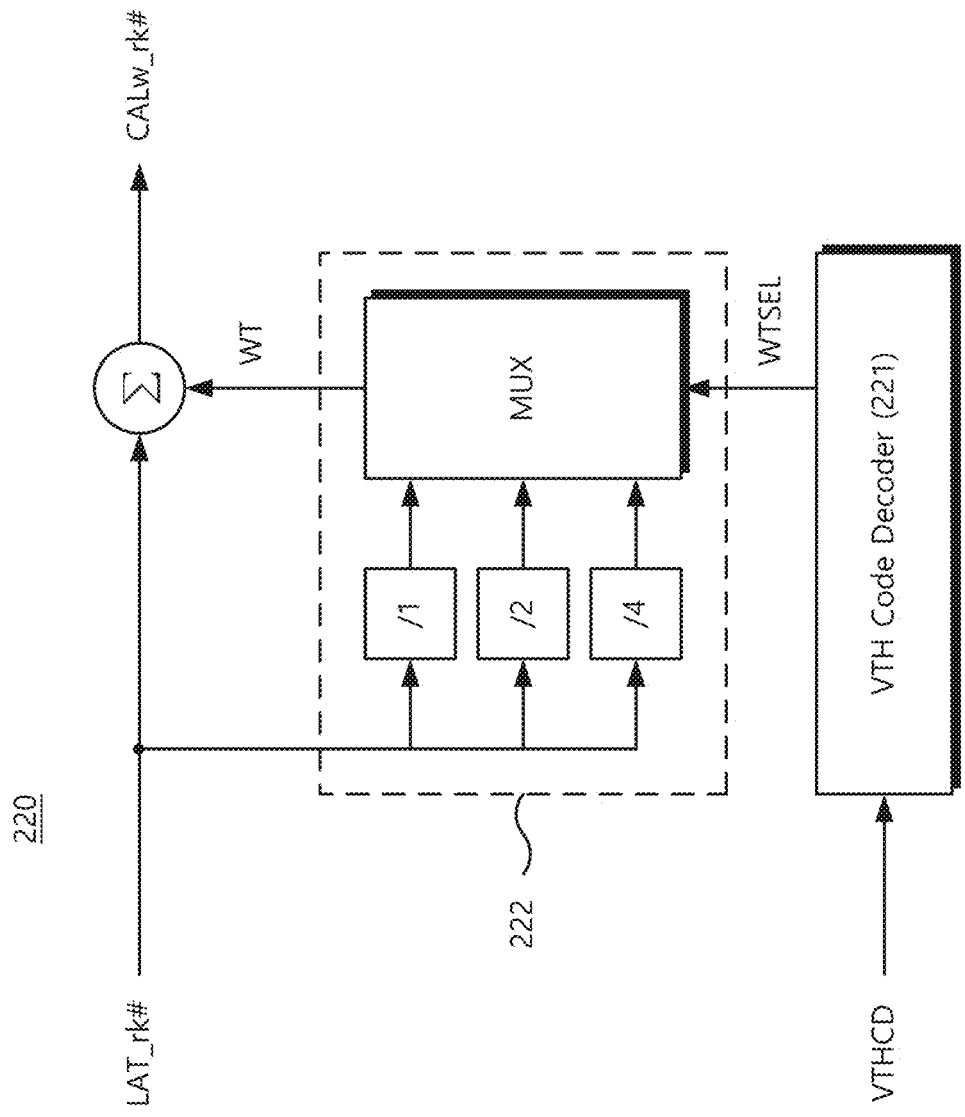
FIG. 11 is a diagram illustrating one of a plurality of weight control circuits of the coefficient decision circuit of FIG. 10, according to an example embodiment.

FIG. 11 is a diagram illustrating one the weight control circuits of FIG. 10, according to an example embodiment. Referring to FIG. 11, the weight control circuit 220 may include a threshold voltage code decoder 221 and a multiple selector 222.

According to an example embodiment, the threshold voltage code decoder 221 may receive the threshold voltage code VTHCD. The threshold voltage code decoder 221 may decode the threshold voltage code VTHCD and output a weight selection signal WTSEL.

According to an example embodiment, the multiple selector 222 may output a weight WT based on the weight selection signal WTSEL. For example, the multiple selector 222 may include a plurality of multiple lines and a multiplexer MUX. The latency LAT_rk # of each rank signal may be transmitted to the multiplexer through respective ones of the plurality of multiple lines. Weights according to a plurality of weight ratios may be transmitted to the multiplexer. The multiplexer may output a weight WT corresponding to the weight selection signal WTSEL. One of the plurality of weight control circuits 220 may apply the weight WT to the latency LAT_rk # of each rank signal to output a weighted calibration code CALw_rk # of each core die.

FIG. 12 is a table illustrating examples of a threshold voltage code output from the threshold voltage detection circuit 210 of FIG. 10 and weight ratios used in weight control circuits of FIG. 10, according to some example embodiments. Referring to FIG. 12, the threshold voltage code VTHCD may include a 3-bit P code (for example, P<0:2>) and a 3-bit N code (for example, N<0:2>). Although FIG. 12 illustrates the threshold voltage code VTHCD in three-stages, this is an example and, in some example embodiments, the threshold voltage code VTHCD may have at least two or more stages.

According to an example embodiment, a slow code SS, which has a small delay variation because the threshold voltage of the transistors included in the buffer die 1210 is higher than the reference voltage, may be set to '111'. Fast code FF, which has a large delay variation because the threshold voltage is lower than the reference voltage, may be set to '000'. The normal code TT, which has a delay variation range between the slow code SS and the fast code FF, may be set to '100'.

According to an example embodiment, a weight may be set corresponding to the threshold voltage code VTHCD. The slow code SS may be converted to the largest weight (for example, a 2.35 multiplier). The fast code FF may be converted to the smallest weight (for example, a 1.00 multiplier). The normal code TT may be converted to a weight (for example, a 1.50 multiplier) between the weight of the slow code SS and the weight of the fast code FF.

Figure 13:
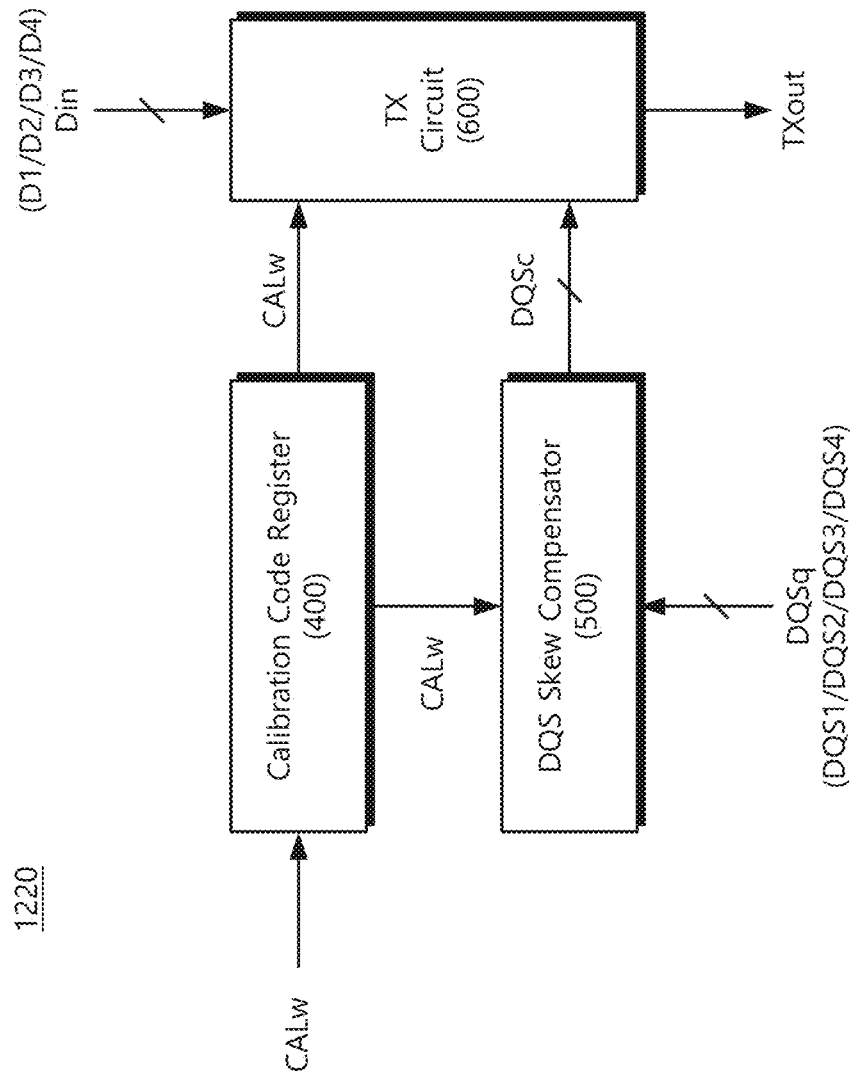
FIG. 13 is a diagram illustrating components included in a first core die of the memory device of FIG. 2, according to an example embodiment.

FIG. 13 is a diagram illustrating components included in the first core die 1220 of FIG. 2, according to an example embodiment. Referring to FIGS. 2 and 13, the first core die 1220 may include a calibration code register 400, a DQS skew compensator 500, and a transmitter (TX) circuit 600. FIG. 13 illustrates the first core die 1220 as an example, but the remaining core dies (for example, the second core die 1230 and the third core die 1240) have a same configuration as the first core die 1220, and thus repeated description thereof is omitted for conciseness.

According to an example embodiment, the calibration code register 400 may receive the weighted calibration code CALw from the coefficient decision circuit 200 of the buffer die 1210 through the TSV and store the weighted calibration code CALw. The calibration code register 400 may transmit the weighted calibration code CALw to the DQS skew compensator 500 and the transmitter circuit 600.

According to an example embodiment, the DQS skew compensator 500 may receive quadrature data strobe signals DQSq from the DQS generation circuit 300 of the buffer die 1210 through the TSV. The quadrature data strobe signals DQSq may include the first strobe signal DQS1, the second strobe signal DQS2, the third strobe signal DQS3, and the fourth strobe signal DQS4.

According to an example embodiment, the DQS skew compensator 500 may calibrate the quadrature data strobe signals DQSq based on the weighted calibration code CALw. The DQS skew compensator 500 may output calibrated data strobe signals DQSc. The calibrated data strobe signals DQSc may include calibrated signals of the first strobe signal DQS1, the second strobe signal DQS2, the third strobe signal DQS3, and the fourth strobe signal DQS4. Accordingly, data collisions which occur when a phase difference between the data strobe signals of the first to third core dies 1220, 1230, and 1240 of FIG. 2 deviates from a specified phase difference may be prevented. Skew among the data strobe signals of the first to third core dies 1220, 1230, and 1240 of FIG. 2 may be compensated.

According to an example embodiment, the transmitter (TX) circuit 600 may receive input data Din from the memory cell array 1221 of FIG. 3 and output a transmitter output signal TXout based on the calibrated data strobe signals DQSc. The input data Din may include first input data D1, second input data D2, third input data D3, and fourth input data D4. The transmitter circuit 600 may sample the input data Din based on the calibrated data strobe signals DQSc. For example, the transmitter circuit 600 may sample the first input data D1 based on the calibrated signal of the first strobe signal DQS1, may sample the second input data D2 based on the calibrated signal of the second strobe signal DQS2, may sample the third input data D3 based on the calibrated signal of the third strobe signal DQS3, and may sample the fourth input data signal D4 based on the calibrated signal of the fourth strobe signal DQS4. The transmitter output signal TXout may be transmitted to the buffer die 1210 through the TSV.

Figure 14:
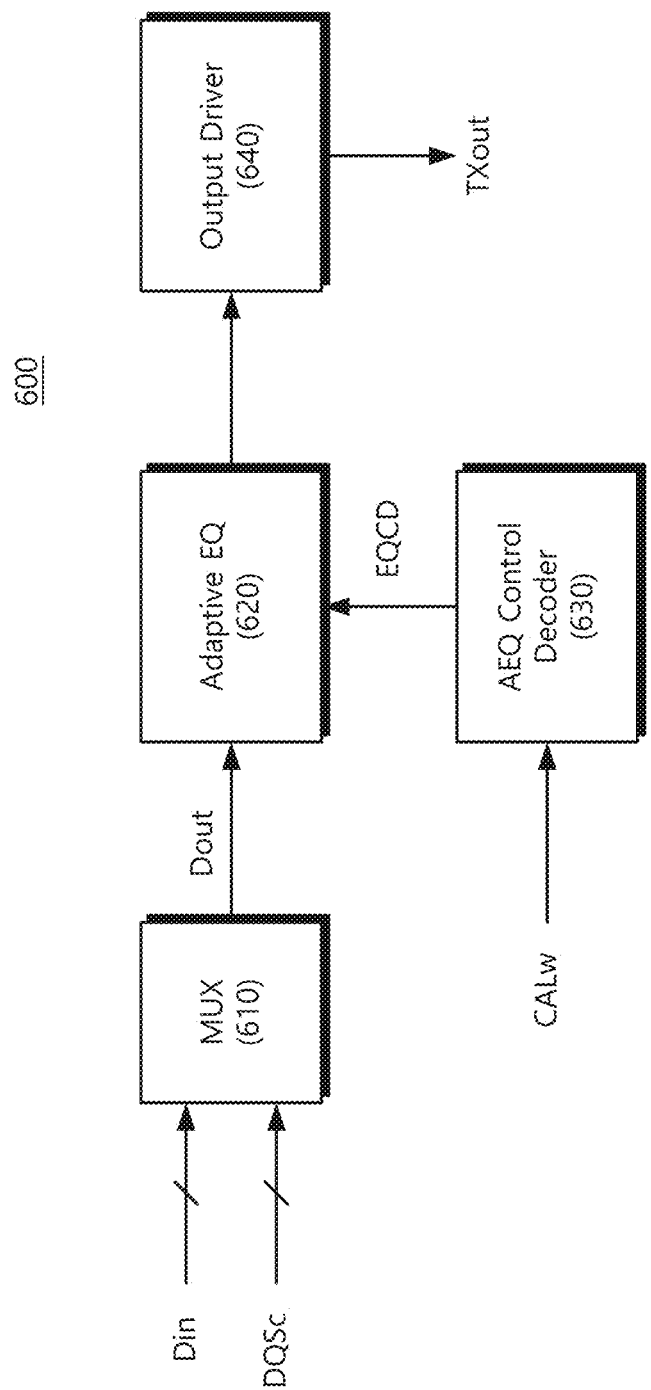
FIG. 14 is a diagram illustrating an example of a transmitter circuit of the first core die of FIG. 13, according to an example embodiment.
Figure 15:
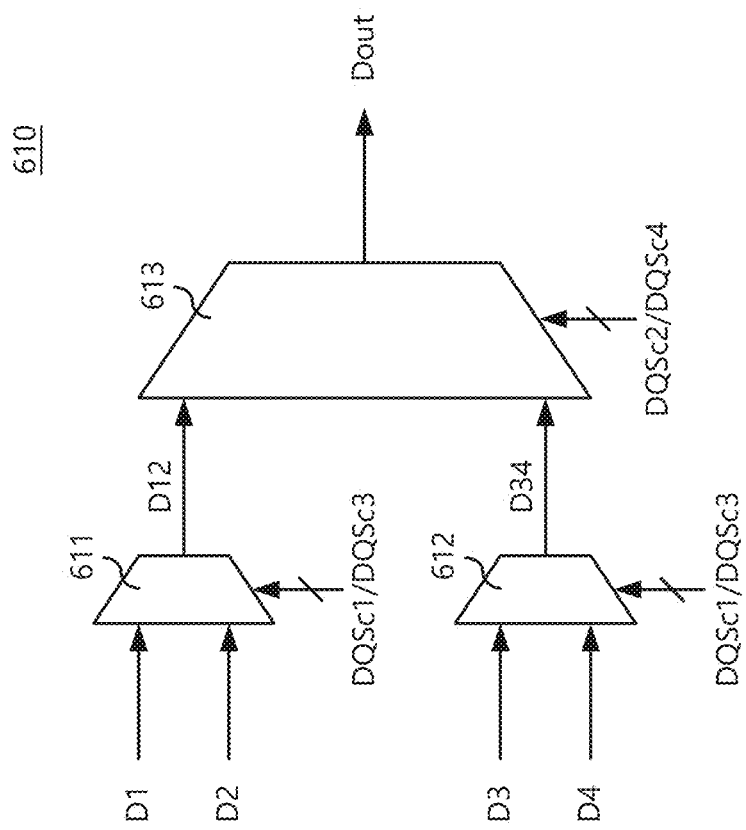
FIG. 15 is a diagram illustrating an example of a multiplexer of the transmitter circuit of FIG. 14, according to an example embodiment.
Figure 16:
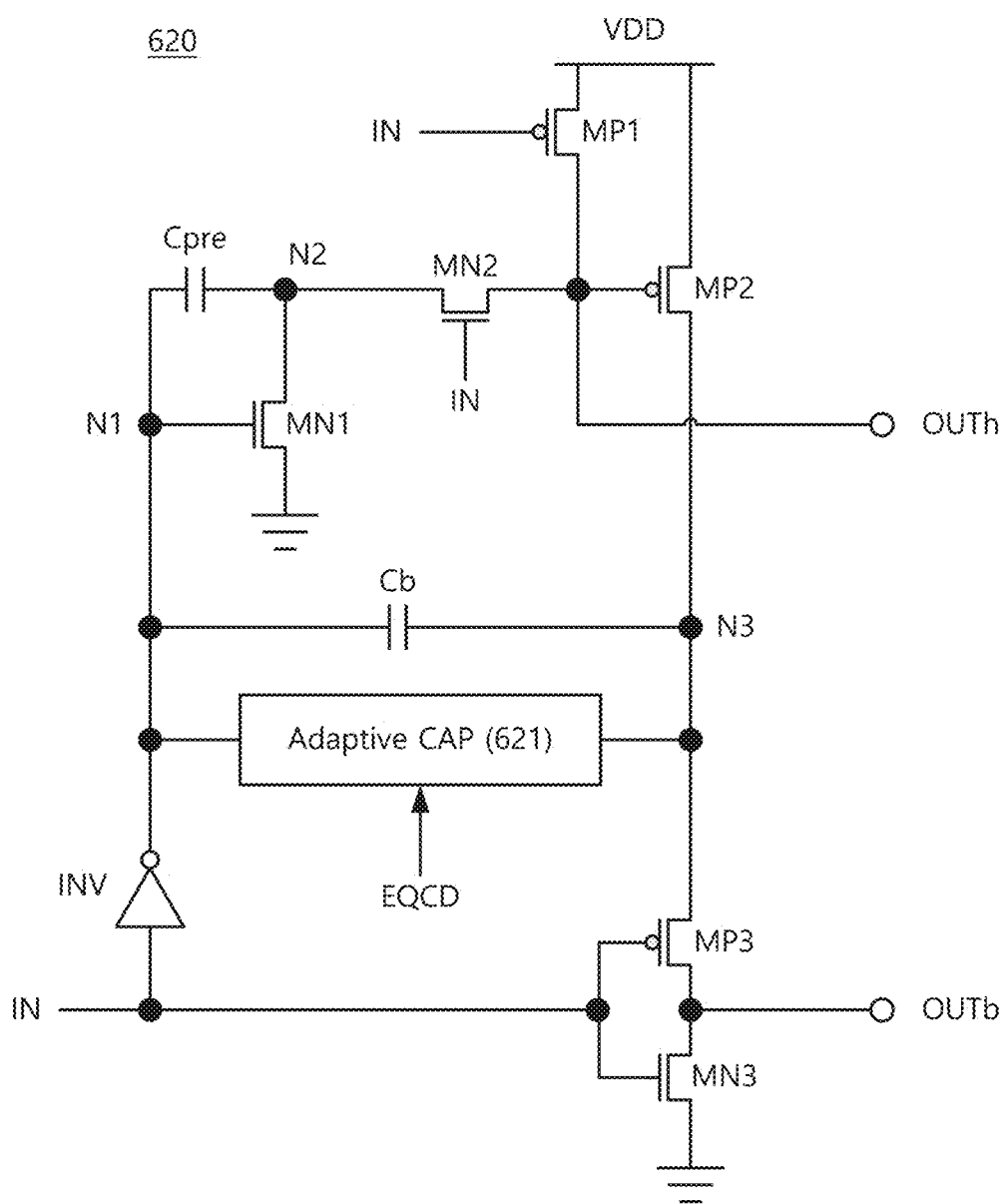
FIG. 16 is a diagram illustrating an example of an adaptive equalizer of the transmitter circuit of FIG. 14, according to an example embodiment.

FIG. 14 is a diagram illustrating an example of the transmitter (TX) circuit 600 of FIG. 13, according to an example embodiment. Referring to FIGS. 13 and 14, the transmitter circuit 600 may include a multiplexer (MUX) 610, an adaptive equalizer (EQ) 620, an AEQ control decoder 630, and an output driver 640 . . . . FIG. 15 is a diagram illustrating an example of the multiplexer (MUX) 610 of FIG. 14, according to an example embodiment. FIG. 16 is a diagram illustrating an example of the adaptive equalizer (EQ) of FIG. 14, according to an example embodiment.

According to an example embodiment, the multiplexer 610 may sample the input data Din based on the calibrated data strobe signals DQSc and transmit output data Dout. As an example, referring to FIG. 15, the multiplexer 610 may include a first multiplexer 611, a second multiplexer 612, and a third multiplexer 613. The first multiplexer 611 may sample the first data D1 and the second data D2 based on a first calibration strobe signal DQSc1 and a third calibration strobe signal DQSc3, and may output first intermediate data D12. The second multiplexer 612 may sample the third data D3 and the fourth data D4 based on the first calibration strobe signal DQSc1 and the third calibration strobe signal DQSc3, and may output second intermediate data D34. The third multiplexer 613 may sample the first intermediate data D12 and the second intermediate data D34 based on the second calibration strobe signal DQSc2 and the fourth calibration strobe signal DQSc4, and may output the output data Dout. The output data Dout may be serialized data of the first to fourth data D1, D2, D3, and D4.

According to an example embodiment, the adaptive equalizer (EQ) 620 may boost a voltage level of the output data Dout and transmit the boosted output data Dout to the output driver 640. The AEQ control decoder 630 may convert the weighted calibration code CALw into an equalizing code EQCD and provide the equalizing code EQCD to the adaptive equalizer 620. The adaptive equalizer 620 may adaptively boost the voltage level of the output data Dout based on the equalizing code EQCD.

As an example, referring to FIG. 16, the adaptive equalizer 620 may include a first N-type transistor MN1, a second N-type transistor MN2, a third N-type transistor MN3, a first P-type transistor MP1, second P-type transistor MP2, third P-type transistor MP3, a precharge capacitor Cpre, a booster capacitor Cb, an inverter INV, and an adaptive capacitor (CAP) 621.

The adaptive equalizer 620 may generate a boost pull-up signal OUTb and a hold pull-up signal OUTh. The boost pull-up signal OUTb may pull up the transmitter output signal TXout of the output driver 640 to a supply voltage VDD of the output driver 640. The hold pull-up signal OUTh may have a same polarity with the boost pull-up signal OUTb when a level of the boost pull-up signal OUTb is fixed for a specified time and a leakage current occurs. The hold pull-up signal OUTh may be transmitted to the output driver 640 to maintain the transmitter output signal TXout. The adaptive equalizer 620 may receive an input signal IN (for example, the output data Dout of FIG. 14) and generate the boost pull-up signal OUTb and the hold pull-up signal OUTh based on the supply voltage VDD.

The adaptive equalizer 620 may have a precharge state and a booster state. When the supply voltage VDD is input as the input signal IN, the adaptive equalizer 620 may be in the precharge state. The input signal IN may pass through the inverter INV and a ground voltage VSS may be applied to a first node N1. A voltage lower than that of the first node N1 may be applied to a second node N2 by the voltage of the precharge capacitor Cpre. The second N-type transistor MN2 may be turned on by the input signal IN, and the same voltage as that of the second node N2 may be applied to the hold pull-up signal OUTh. Since a voltage lower than the ground voltage VSS is applied to the second node N2, the second P-type transistor MP2 may be turned on, and the supply voltage VDD may be applied to a third node N3. Due to the input signal IN, the third N-type transistor MN3 may be turned on, and the ground voltage VSS may be applied to the boost pull-up signal OUTb.

When the ground voltage VSS is input as the input signal IN, the adaptive equalizer 620 may be in the booster state. The input signal IN may be applied to the first node N1 through the inverter INV, and then the supply voltage VDD may be applied to the first node N1. The first N-type transistor MN1 may be turned on by the first node N1, and the ground voltage VSS may be applied to the second node N2. The first P-type transistor MP1 may be turned on by the input signal IN, and the supply voltage VDD may be applied to the hold pull-up signal OUTh. A voltage higher than the supply voltage VDD by a voltage value of the booster capacitor Cb may be applied to the third node N3. The third P-type transistor MP3 may be turned on by the input signal IN, and the same voltage as that of the third node N3 may be applied to the boost pull-up signal OUTb.

Therefore, by adding the adaptive equalizer 620, when the supply voltage VDD is input as the input signal IN, the adaptive equalizer 620 may be in the precharge state, and the boost pull-up signal OUTb may be set to the ground voltage VSS, and the hold pull-up signal OUTh may have a lower value than the ground voltage VSS. When the ground voltage VSS is input as the input signal IN, the adaptive equalizer 620 may be in the booster state, and the boost pull-up signal OUTb may be set to a higher voltage than the supply voltage VDD, and the hold pull-up signal OUTh may have the supply voltage VDD. As a result, amplitudes of the two pull-up signals, the boost pull-up signal OUTb and the hold pull-up signal OUTh, may both have a value greater than an amplitude of the input signal IN. Accordingly, by adding the adaptive equalizer 620, the transmitter circuit 600 may compensate for a decrease in a slew rate of the output driver 640 due to a low supply voltage.

In some example embodiments, the adaptive equalizer 620 may include the adaptive capacitor (CAP) 621 connected between the first node N1 and the third node N3. The adaptive capacitor 621 may be connected in parallel with the booster capacitor Cb. The adaptive capacitor 621 may vary its capacitance based on the equalizing code EQCD. The adaptive equalizer 620 may adaptively adjust a boosting intensity of the output data Dout by adjusting the capacitance of the adaptive capacitor 621.

Figure 17:
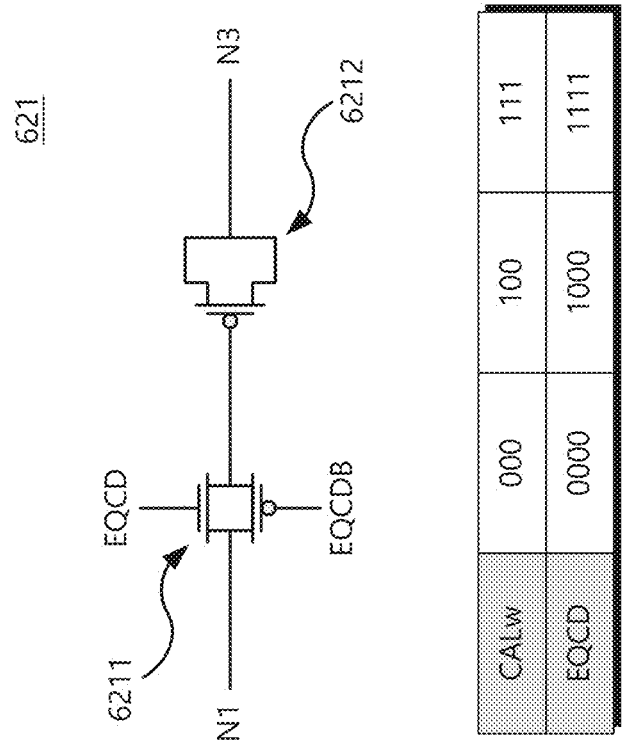
FIG. 17 is a diagram illustrating an example of an adaptive capacitor of the adaptive equalizer of FIG. 16, according to an example embodiment.

FIG. 17 is a diagram illustrating an example of the adaptive capacitor 620 of FIG. 16, according to an example embodiment. As an example, referring to FIG. 17, the adaptive capacitor (CAP) 621 may include a transfer gate 6211 and a MOS capacitor 6212. The transfer gate 6211 may be turned on by a specified amount based on the equalizing code EQCD. The capacitance of the MOS capacitor 6212 may be determined based on a size at which the transfer gate 6211 is turned on. The AEQ control decoder 630 may convert the 3-bit weighted calibration code CALw (for example, 000, 100, 111) into a 4-bit equalizing code EQCD (for example, 0000, 1000, 1111) to be applied to the transfer gate 6211.

Figure 18:
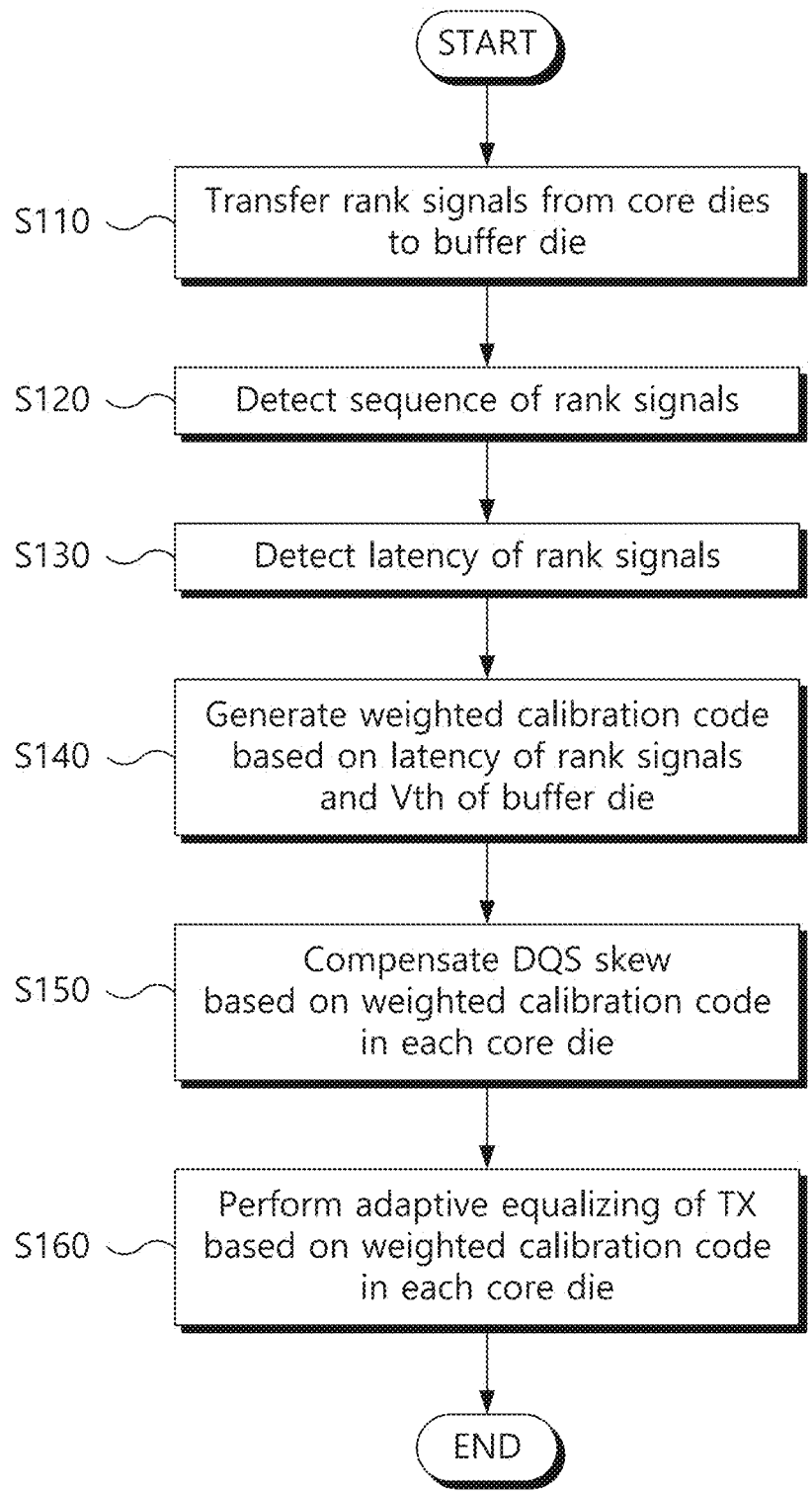
FIG. 18 is a flowchart illustrating a method of compensating for skew of data strobe signals of a memory device according to example embodiments.

FIG. 18 is a flowchart illustrating a method of compensating for skew of data strobe signals of a memory device according to example embodiments. Referring to FIGS. 2 to 18, the memory device 1200 may generate a calibration code (for example, the weighted calibration code CALw) of the data strobe signals of each of the first to third core dies 1220, 1230, and 1240 in the buffer die 1210, and the skew of the data strobe signals may be compensated by applying the generated calibration code to each of the first to third core dies 1220, 1230, and 1240.

According to an example embodiment, in operation S110, the memory device 1200 may transmit rank signals from the plurality of core dies to the buffer die. For example, the memory device 1200 may transmit rank signals (for example, a first rank signal RK1, a second rank signal RK2, and a third rank signal RK3) from the plurality of core dies (for example, the first to third core dies 1220, 1230, and 1240) to the buffer die 1210 through the TSVs. For example, a plurality of via holes may be formed in each of the buffer die 1210 and the plurality of core dies 1220, 1230, and 1240, and an inside of the via holes may be filled with the TSVs, respectively.

Accordingly, data may be easily transferred between the buffer die 1210 and the plurality of core dies through the TSVs. The memory device 1200 (for example, a high-bandwidth memory) may not only enable a high-speed data transfer through the TSVs but also reduce power consumption. However, due to an increase in the data rate at the data input/output pin, when a phase difference between the data strobe signals DQS of the plurality of core dies exceeds a specified phase difference, data collision may occur.

According to an example embodiment, in operation S120, the memory device 1200 may detect a sequence of the rank signals. For example, the memory device 1200 may detect an order according to phases of the rank signals. For example, the sequence detection circuit 110 of the DQS calibration circuit 100 may compare the phases of the first rank signal RK1, the second rank signal RK2, and the third rank signal RK3, and the rank selection signal RKSEL may be generated based on the order of the first rank signal RK1, the second rank signal RK2, and the third rank signal RK3. The multiplexer 101 of the DQS calibration circuit 100 may output the rank signal SRK selected among the first rank signal RK1, the second rank signal RK2, and the third rank signal RK3 in order of rapid phase based on the rank selection signal RKSEL.

According to an example embodiment, in operation S130, the memory device 1200 may detect a latency of the rank signals. For example, the memory device 1200 may detect a latency of each of the rank signals. For example, the delay line circuit 120 of the DQS calibration circuit 100 may receive the reference strobe signal DQSref and delay the reference strobe signal DQSref by a specified amount. The delay line circuit 120 may adjust a delay amount based on the count value CNT. The replica delay line circuit 130 of the DQS calibration circuit 100 may delay the selected rank signal SRK by the specified amount.

The bang-bang phase detector 140 of the DQS calibration circuit 100 may compare a phase of a signal output by the delay line circuit 120 and a phase of a signal output by the replica delay line circuit 130, and the phase detection signal PDout may be output according to the comparison result. The calibration control circuit 150 of the DQS calibration circuit 100 may generate the count control signal CTcon based on the phase detection signal PDout.

The latency detection circuit 160 of the DQS calibration circuit 100 may output the count value CNT and/or the latency LAT based on the count control signal CTcon. For example, when the count control signal CTcon is at the first level, the latency detection circuit 160 may increase the count value CNT by a specified amount (for example, 1). When the count control signal CTcon is at the second level, the latency detection circuit 160 may store and output the latency LAT. The DQS calibration circuit 100 may store and output a latency LAT for each of the first rank signal RK1, the second rank signal RK2, and the third rank signal RK3.

According to an example embodiment, in operation S140, the memory device 1200 may generate the weighted calibration code CALw based on the latency of the rank signals and the threshold voltage (Vth) of the buffer die 1210. For example, the memory device 1200 may generate the weighted calibration code CALw based on the latency of each of the rank signals and the threshold voltage (Vth) of the buffer die 1210. For example, the threshold voltage detection circuit 210 of the coefficient decision circuit 200 may generate the threshold voltage code VTHCD of the buffer die 1210 based on the reference strobe signal DQSref. The threshold voltage detection circuit 210 may generate the threshold voltage code VTHCD so that a delay width as the count value CNT of the delay line circuit 120 increases may converge on a value when the average threshold voltage of the transistors included in the buffer die 1210 is the reference voltage.

Each of the plurality of weight control circuits 220 of the coefficient decision circuit 200 may apply a weight according to the threshold voltage code VTHCD to the latency LAT corresponding to a respective one of the plurality of core dies 1220, 1230, and 1240 to output the weighted calibration codes CALw corresponding to each of the first to third core dies 1220, 1230, and 1240. The threshold voltage code decoder 221 of each of the plurality of weight control circuits 220 may decode the threshold voltage code VTHCD and output the weight selection signal WTSEL. The multiple selector 222 of each of the plurality of weight control circuits 220 may output the weight WT based on the weight selection signal WTSEL.

According to an example embodiment, in operation S150, the memory device 1200 may compensate for the DQS skew based on the weighted calibration code CALw in each core die. For example, the memory device 1200 may compensate for the DQS skew of the data strobe signals in each of the first to third core dies 1220, 1230, and 1240 based on the weighted calibration codes CALw. For example, the calibration code register 400 of each of the first to third core dies 1220, 1230, and 1240 may receive and store the weighted calibration code CALw from the coefficient decision circuit 200 of the buffer die 1210 through the TSV.

The calibration code register 400 may transmit the weighted calibration codes CALw to the DQS skew compensator 500. The DQS skew compensator 500 of each of the first to third core dies 1220, 1230, and 1240 may receive the quadrature data strobe signals DQSq from the DQS generation circuit 300 of the buffer die 1210 through the TSVs. The DQS skew compensator 500 may calibrate the quadrature data strobe signals DQSq based on the weighted calibration codes CALw and transmit the calibrated data strobe signals DQSc to the transmitter circuit 600.

According to an example embodiment, in operation S160, the memory device 1200 may perform adaptive equalization of the transmitter circuit 600 based on the weighted calibration code CALw in each of the first to third core dies 1220, 1230, and 1240. For example, the multiplexer 610 of the transmitter circuit 600 may sample the input data Din and may output the output data Dout based on the calibrated data strobe signals DQSc. The adaptive equalizer 620 of the transmitter circuit 600 may boost the voltage level of the output data Dout and transmit the boosted output data Dout to the output driver 640 of the transmitter circuit 600. The AEQ control decoder 630 of the transmitter circuit 600 may convert the weighted calibration code CALw to the equalizing code EQCD. The adaptive equalizer 620 may adaptively boost the voltage level of the output data Dout based on the equalizing code EQCD. The adaptive equalizer 620 may include the adaptive capacitor 621, and may adaptively adjust the boosting intensity of the output data Dout by adjusting the capacitance of the adaptive capacitor 621.

Figure 19:
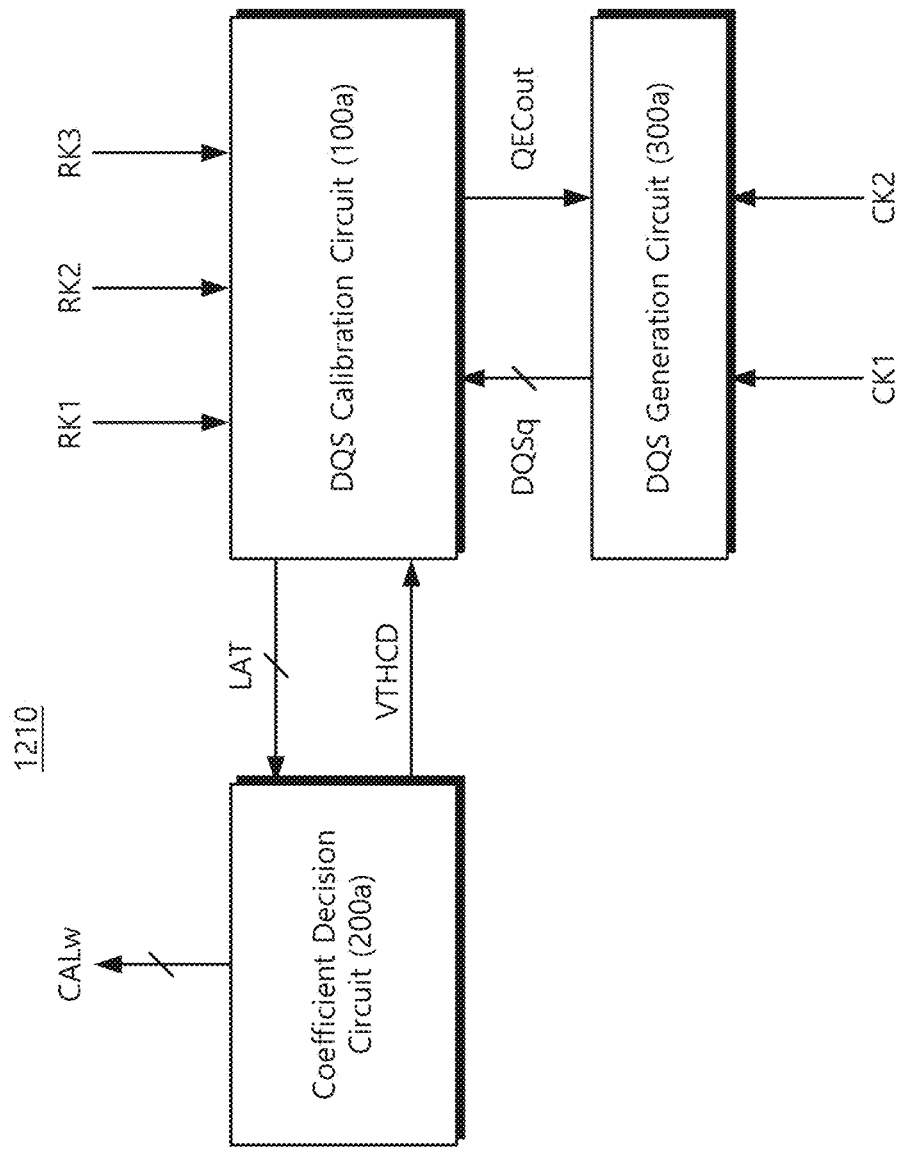
FIG. 19 is a diagram illustrating an example of performing error detection of quadrature data strobe signals in the DQS calibration circuit of FIG. 4, according to an example embodiment.

FIG. 19 is a diagram illustrating an example of performing error detection of quadrature data strobe signals in a DQS calibration circuit, according to an example embodiment. Referring to FIG. 19, the buffer die 1210 may include a DQS calibration circuit 100*a*, a coefficient decision circuit 200*a*, and a DQS generation circuit 300*a*. The DQS calibration circuit 100*a*, the coefficient decision circuit 200*a*, and the DQS generation circuit 300*a* are similar to the DQS calibration circuit 100, the coefficient decision circuit 200, and the DQS generation circuit 300, respectively, of FIG. 4 and therefore mainly the differences will be described. The DQS calibration circuit 100*a* may receive rank signals (or data strobe signals) from each of the plurality of core dies of FIG. 2 through TSVs, respectively. The DQS calibration circuit 100*a* may calculate a latency LAT of each of the rank signals (for example, a first rank signal RK1, a second rank signal RK2, and a third rank signal RK3) of the plurality of core dies. The DQS generation circuit 300*a* may generate a plurality of data strobe signals (for example, quadrature data strobe signals DQSq) based on a first clock signal CK1 and a second clock signal CK2.

According to an example embodiment, the coefficient decision circuit 200*a* may detect an effect of an average threshold voltage of transistors included in the buffer die 1210 based on the rank signals, and apply a weight to the latency LAT of each core die detected by the DQS calibration circuit 100*a*. The threshold voltage detection circuit 210 may generate the threshold voltage code VTHCD of the buffer die 1210 based on the reference strobe signal DQSref. The coefficient decision circuit 200 may apply a weight according to the threshold voltage code VTHCD to the latency LAT corresponding to each of the first to third core dies 1220, 1230, and 1240, and output the weighted calibration code CALw corresponding to each of the first to third core dies 1220, 1230, and 1240.

According to an example embodiment, the coefficient decision circuit 200*a* may transmit the threshold voltage code VTHCD to the DQS calibration circuit 100*a*. The DQS calibration circuit 100*a* may simplify an error detection operation of the quadrature data strobe signals based on the threshold voltage code VTHCD. The DQS calibration circuit 100*a* may transmit an error detection feedback signal QECout to the DQS generation circuit 300*a*. The DQS generation circuit 300*a* may generate error-calibrated quadrature data strobe signals DQSq based on the error detection feedback signal QECout.

Figure 20:
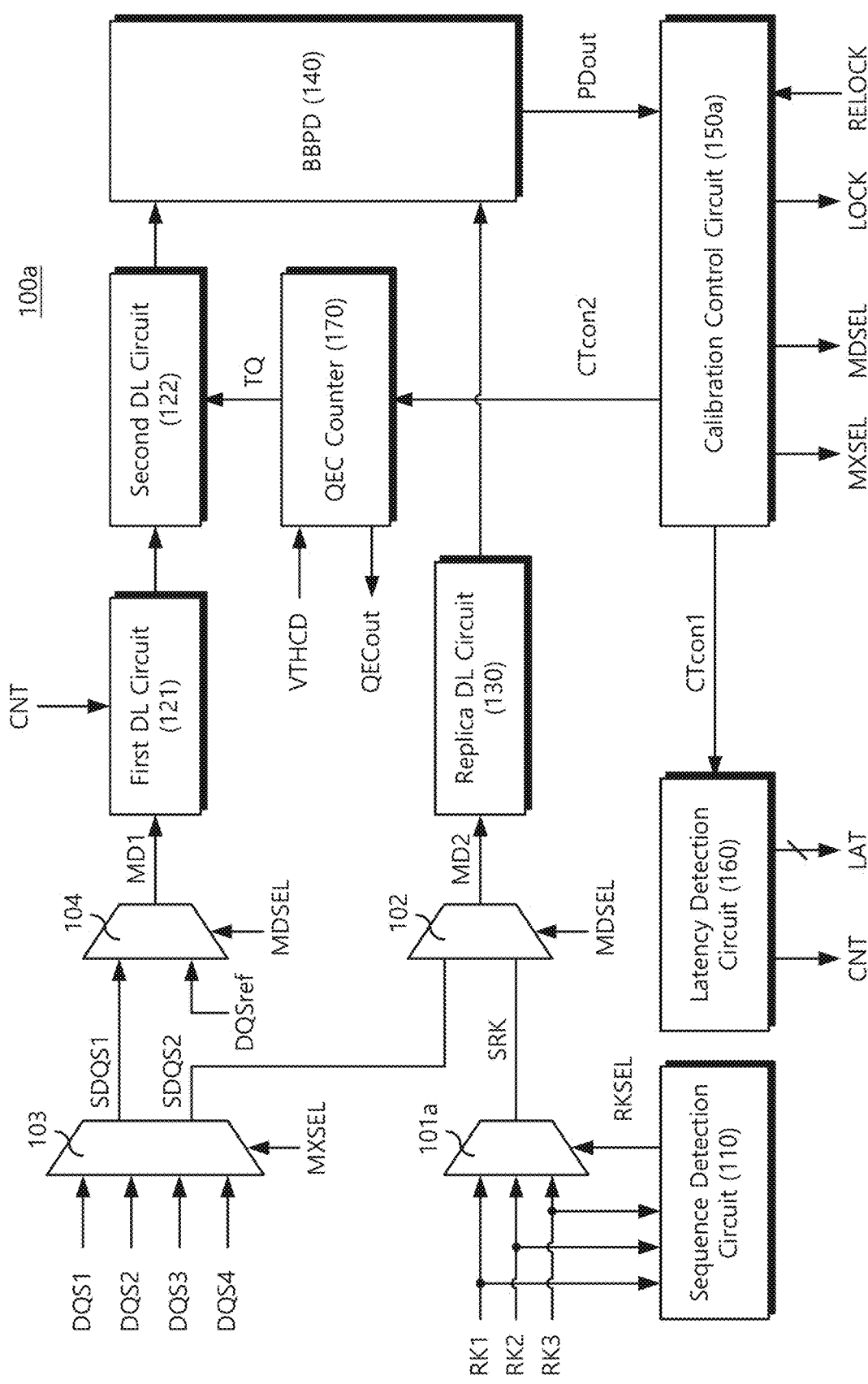
FIG. 20 is a diagram illustrating an example of the DQS calibration circuit of FIG. 19, according to an example embodiment.

FIG. 20 is a diagram illustrating an example of the DQS calibration circuit 100*a* of FIG. 19, according to an example embodiment. Referring to FIGS. 19 and 20, the DQS calibration circuit 100 may include a first multiplexer 101*a*, a second multiplexer 102, a third multiplexer 103, a fourth multiplexer 104, and the sequence detection circuit 110, a first delay line (DL) circuit 121, a second delay line (DL) circuit 122, the replica delay line (DL) circuit 130, the bang-bang phase detector (BBPD) 140, a calibration control circuit 150*a*, the latency detection circuit 160, and a QEC counter 170. The first multiplexer 101*a*, the first delay line (DL) circuit 121, the sequence detection circuit 110, the replica delay line (DL) circuit 130, the BBPD 140, and the latency detection circuit 160 are similar to the multiplexer 101, the delay line (DL) circuit 120, the sequence detection circuit 110, the replica delay line (DL) circuit 130, the BBPD 140, and the latency detection circuit 160 in FIG. 6 and thus mainly differences will be described below. The DQS calibration circuit 100*a* may operate in a latency detection mode or an error detection mode of data strobe signals based on a mode selection signal MDSEL.

First, the DQS calibration circuit 100*a* may operate in a latency detection mode.

According to an example embodiment, the sequence detection circuit 110 may detect an order of the rank signals (for example, the first rank signal RK1, the second rank signal RK2, and the third rank signal RK3) of the plurality of core dies. For example, the sequence detection circuit 110 may compare phases of the first rank signal RK1, the second rank signal RK2, and the third rank signal RK3 to generate a rank selection signal RKSEL based on the order of the first rank signal RK1, the second rank signal RK2, and the third rank signal RK3.

According to an example embodiment, the first multiplexer 101*a* may output a rank signal SRK selected in order of rapid phase among the first rank signal RK1, the second rank signal RK2, and the third rank signal RK3 based on the rank selection signal RKSEL. For example, the rank selection signal RKSEL may include 2 bits. When the rank selection signal RKSEL is '01', the first multiplexer 101*a* may output a rank signal with the fastest phase. When the rank selection signal RKSEL is '10', the first multiplexer 101*a* may output a rank signal with an intermediate phase. When the rank selection signal RKSEL is '11', the first multiplexer 101*a* may output a rank signal with the slowest phase.

According to an example embodiment, the fourth multiplexer 104 may output the reference strobe signal DQSref as a first mode signal MD1 based on a mode selection signal MDSEL. The first delay line circuit 121 may receive the first mode signal MD1 and delay the first mode signal MD1 by a specified amount. The first delay line circuit 121 may adjust a delay amount based on the count value CNT. As the count value CNT increases, the first delay line circuit 121 may delay the first mode signal MD1 more. As an example, in some example embodiments, first mode signal MD1 may be set to one of the first strobe signal DQS1, the second strobe signal DQS2, the third strobe signal DQS3, and the fourth strobe signal DQS4 generated by the DQS generation circuit 300 of FIG. 4. In some example embodiments, the complementary signal of the first strobe signal DQS1 may be set as the first mode signal MD1.

According to an example embodiment, the second multiplexer 102 may output the selected rank signal SRK as a second mode signal MD2 based on a mode selection signal MDSEL. The replica delay line circuit 130 may have a delay amount equal to the sum of a first delay amount of the first delay line circuit 121 and a second delay amount of the second delay line circuit 122. The replica delay line circuit 130 may delay the selected rank signal SRK by a specified amount.

According to an example embodiment, the bang-bang phase detector (BBPD) 140 may compare a phase of a signal output by the second delay line circuit 122 and a phase of a signal output by the replica delay line circuit 130, and output the phase detection signal PDout according to the comparison result. For example, when the phase of the signal output by the second delay line circuit 122 is faster than the phase of the signal output by the replica delay line circuit 130, the phase detection signal PDout may be at a first level (for example, a low level or logic 0). When the phase of the signal output by the second delay line circuit 122 is slower than or equal to the phase of the signal output by the replica delay line circuit 130, the phase detection signal PDout may be at a second level (for example, a high level or logic 1).

According to an example embodiment, the calibration control circuit 150*a* may generate a first count control signal CTcon1 based on the phase detection signal PDout. For example, when the phase detection signal PDout is at the first level, the first count control signal CTcon1 may be at the first level. When the phase detection signal PDout is at the second level, the first count control signal CTcon1 may be at the second level.

According to an example embodiment, the latency detection circuit 160 may output a count value CNT and/or a latency LAT based on the first count control signal CTcon1. For example, when the first count control signal CTcon1 is at the first level, the latency detection circuit 160 may increase the count value CNT by a specified amount (for example, 1). When the first count control signal CTcon1 is at the second level, the latency detection circuit 160 may store and output the latency LAT.

According to an example embodiment, the DQS calibration circuit 100*aa* may repeatedly perform the above-described latency detection operation for each of the first rank signal RK1, the second rank signal RK2, and the third rank signal RK3. The DQS calibration circuit 100 may transmit the latency LAT of each of the first to third core dies 1220, 1230, and 1240 measured by the latency detection operation to the coefficient decision circuit 200*a*.

Second, the DQS calibration circuit 100*a* may operate in an error detection mode of the data strobe signals.

According to an example embodiment, the third multiplexer 103 may select two of the first strobe signal DQS1, the second strobe signal DQS2, the third strobe signal DQS3, and the fourth strobe signal DQS4 based on a multiplexer selection signal MXSEL, and output the selected two strobe signals as a first selection strobe signal SDQS1 and a second selection strobe signal SDQS2. The fourth multiplexer 104 may output the first selection strobe signal SDQS1 as the first mode signal MD1 based on the mode selection signal MDSEL. The second multiplexer 102 may output the second selection strobe signal SDQS2 as the second mode signal MD2 based on the mode selection signal MDSEL.

According to an example embodiment, the first delay line (DL) circuit 121 may receive the first mode signal MD1 and delay the first mode signal MD1 by a specified amount. At this time, the count value CNT may be fixed to '0'. A delay amount of the second delay line circuit 122 may be determined based on an error check signal TQ (see below).

According to an example embodiment, the replica delay line (DL) circuit 130 may have a delay amount equal to the sum of a first delay amount of the first delay line circuit 121 and a second delay amount of the second delay line circuit

122. The replica delay line circuit 130 may delay the second mode signal MD2 by a specified amount.

According to an example embodiment, the bang-bang phase detector (BBPD) 140 may compare a phase of a signal output by the second delay line circuit 122 and a phase of a signal output by the replica delay line circuit 130, and may output the phase detection signal PDout according to the comparison result. As an example, when the phase of the signal output by the second delay line circuit 122 is faster than the phase of the signal output by the replica delay line circuit 130, the phase detection signal PDout may be at a first level (for example, a low level or logic 0). When the phase of the signal output by the second delay line circuit 122 is slower than or equal to the phase of the signal output by the replica delay line circuit 130, the phase detection signal PDout may be at a second level (for example, a high level or logic 1).

According to an example embodiment, the calibration control circuit 150*a* may generate a second count control signal CTcon2 based on the phase detection signal PDout. For example, when the phase detection signal PDout is at the first level, the second count control signal CTcon2 may be at the first level. When the phase detection signal PDout is at the second level, the second count control signal CTcon2 may be at the second level.

According to an example embodiment, the QEC counter 170 may receive the second count control signal CTcon2 and generate the error check signal TQ based on the second count control signal CTcon2. As an example, when the second count control signal CTcon2 is at the first level, the QEC counter 170 may increase the error check signal TQ. When the second count control signal CTcon2 is at the first level, the QEC counter 170 may output the error detection feedback signal QECout. The QEC counter 170 may adjust the error check signal TQ based on the threshold voltage code VTHCD and simplify the error detection operation of the data strobe signals.

According to various example embodiments, it may be possible for a buffer die to generate skew compensation codes for data strobe signals used in each of a plurality of core dies.

According to various example embodiments, it may be possible to reflect characteristics caused by changes in a threshold voltage of a buffer die into a skew compensation code.

While various example embodiments have been described with reference to the drawings, it will be apparent to those of ordinary skill in the art that various changes and modifications may be made thereto without departing from the spirit and scope of the present disclosure as set forth in the following claims.

What is claimed is:

1. A memory device comprising:
a plurality of core dies including memory cell arrays; and
a buffer die electrically connected to the plurality of core dies through at least one through silicon via (TSV),
wherein the buffer die comprises:
a DQS generation circuit configured to receive an external clock signal from an external device and generate a plurality of data strobe signals based on the external clock signal for communicating data with the plurality of core dies;
a DQS calibration circuit configured to detect a latency of each of a plurality of rank signals, the plurality of rank signals being received from the plurality of core dies based on the plurality of data strobe signals, respectively; and
a coefficient decision circuit configured to detect a threshold voltage code of the buffer die, apply a weight to the latency of each of the plurality of rank signals based on the threshold voltage code to generate a weighted calibration code for each of the plurality of rank signals, and transmit the weighted calibration codes to respective ones of the plurality of core dies.

2. The memory device of claim 1, wherein each of the plurality of core dies includes a DQS skew compensator which is configured to calibrate the plurality of data strobe signals based on the weighted calibration codes to generate a plurality of calibrated data strobe signals and transmit the plurality of calibrated data strobe signals to a transmitter circuit.

3. The memory device of claim 2, wherein the transmitter circuit comprises:
a multiplexer configured to convert data read from each of the memory cell arrays into output data based on the plurality of calibrated data strobe signals;
an adaptive equalizer configured to adaptively boost a level of the output data based on an equalizing code; and
an AEQ control decoder configured to decode the weighted calibration code to generate the equalizing code and output the equalizing code to the adaptive equalizer.

4. The memory device of claim 1, wherein the DQS calibration circuit comprises:
a sequence detection circuit configured to detect an order of the plurality of rank signals based on phases of the plurality of rank signals and output a rank selection signal based on the order;
a multiplexer configured to output a selected rank signal selected from among the plurality of rank signals based on the rank selection signal;
a delay line circuit configured to delay a reference strobe signal, which is set to one of the plurality of data strobe signals, based on a count value;
a replica delay line circuit configured to delay the selected rank signal by a delay amount equal to a default delay amount of the delay line circuit;
a phase detector configured to detect a phase difference between a first output signal of the delay line circuit and a second output signal of the replica delay line circuit and output a phase detection signal based on the phase difference;
a calibration control circuit configured to output a count control signal based on the phase detection signal; and
a latency detection circuit configured to output the count value or a latency of the selected rank signal based on the count control signal.

5. The memory device of claim 4, wherein the sequence detection circuit comprises:
a plurality of flip-flops, an input terminal of each of the plurality of flip-flops receiving a respective one of the plurality of rank signals and a clock terminal of each of the plurality of flip-flops receiving another respective one of the plurality of rank signals; and
sequence logic configured to generate the rank selection signal based on output values of the plurality of flip-flops.

6. The memory device of claim 4, wherein the latency detection circuit comprises:
a latency counter configured to output the count value when the count control signal is at a first level and output the latency of the selected rank signal when the count control signal is at a second level; and a latency register configured to store the latency of the selected rank signal and transmit the latency of the selected rank signal to the coefficient decision circuit.

7. The memory device of claim 1, wherein the coefficient decision circuit comprises:
a threshold voltage detection circuit configured to generate the threshold voltage code that corresponds to a difference between an average threshold voltage of transistors included in the buffer die, and a reference threshold voltage based on one of the plurality of data strobe signals.

8. The memory device of claim 7, wherein the coefficient decision circuit comprises:
a plurality of weight control circuits, each configured to apply the weight to the latency of a corresponding one of the plurality of rank signals based on the threshold voltage code to generate the weighted calibration code for the corresponding one of the plurality of rank signals, the plurality of weight control circuits being configured to transmit the weighted calibration codes corresponding to the plurality of core dies to the plurality of core dies through the at least one TSV.

9. The memory device of claim 8, wherein each of the plurality of weight control circuits comprises:
a threshold voltage code decoder configured to decode the threshold voltage code and output a weight selection signal; and
a multiple selector configured to select one of a plurality of weights based on the weight selection signal.

10. The memory device of claim 1, wherein the plurality of data strobe signals comprises:
a first strobe signal;
a second strobe signal configured to have a phase difference of 90 degrees from the first strobe signal;
a third strobe signal configured to have a phase difference of 90 degrees from the second strobe signal; and
a fourth strobe signal configured to have a phase difference of 90 degrees from the third strobe signal.

11. A skew compensation method of a memory device, the skew compensation method comprising:
transmitting a plurality of rank signals that correspond to a plurality of data strobe signals generated in a buffer die based on an external clock signal received from an external device, from a plurality of core dies to the buffer die through at least one through silicon via (TSV);
detecting an order of the plurality of rank signals based on phases of the plurality of rank signals;
detecting a latency of each of the plurality of rank signals;
generating a weighted calibration code for each of the plurality of core dies, based on a threshold voltage of the buffer die and the latency of each of the plurality of rank signals; and
compensating for a skew of the plurality of rank signals of the plurality of core dies based on the weighted calibration codes.

12. The skew compensation method of claim 11, further comprising:
performing adaptive equalization for each of the plurality of core dies based on the weighted calibration codes.

13. The skew compensation method of claim 12, further comprising:
calibrating the plurality of data strobe signals based on the weighted calibration codes to generate a plurality of calibrated data strobe signals;
converting data read from each of the plurality of core dies into output data based on the plurality of calibrated data strobe signals;
adaptively boosting a level of the output data based on an equalizing code; and
decoding the weighted calibration codes and outputting the equalizing code.

14. The skew compensation method of claim 11, wherein detecting the latency of each of the plurality of rank signals comprises:
delaying a reference strobe signal, which is one of the plurality of data strobe signals, based on a count value to generate a first output signal;
delaying a selected rank signal that is selected among the plurality of rank signals according to a determined order by a same delay amount as a default delay amount of the reference strobe signal to generate a second output signal;
detecting a phase difference between the first output signal and the second output signal and outputting a phase detection signal based on the phase difference;
outputting a count control signal based on the phase detection signal; and
outputting the count value or a latency of the selected rank signal based on the count control signal.

15. The skew compensation method of claim 14, wherein the outputting the count value or the latency of the selected rank signal comprises:
outputting the count value when the count control signal is at a first level;
outputting the latency of the selected rank signal when the count control signal is at a second level; and
storing the latency of the selected rank signal.

16. The skew compensation method of claim 11, wherein generating the weighted calibration code for each of the plurality of core dies comprises:
generating a threshold voltage code corresponding to a difference between an average threshold voltage of transistors included in the buffer die, and a reference threshold voltage based on one of the plurality of data strobe signals; and
generating the weighted calibration codes corresponding respectively to the plurality of core dies by applying a weight to the latency of each of the plurality of rank signals based on the threshold voltage code.

17. The skew compensation method of claim 16, wherein generating the weighted calibration codes corresponding respectively to the plurality of core dies comprises:
decoding the threshold voltage code and outputting a weight selection signal; and
selecting one of a plurality of weights based on the weight selection signal.

18. The skew compensation method of claim 16, further comprising:
compensating for a skew of the plurality of rank signals by:
transmitting the weighted calibration codes to the plurality of core dies through the at least the one TSV; and
calibrating the plurality of data strobe signals in the plurality of core dies based on the weighted calibration codes.

19. A memory device comprising:
a plurality of core dies including memory cell arrays; and
a buffer die electrically connected to the plurality of core dies through at least one through silicon via (TSV), wherein the buffer die comprises:
- a DQS generation circuit configured to receive an external clock signal from an external device and generate a plurality of data strobe signals based on the external clock signal for communicating data with the plurality of core dies;
- a DQS calibration circuit configured to detect a latency of each of a plurality of rank signals, the plurality of rank signals being received from the plurality of core dies based on the plurality of data strobe signals, respectively; and
- a coefficient decision circuit configured to detect a threshold voltage code of the buffer die, apply a weight to the latency of each of the plurality of rank signals based on the threshold voltage code to generate a weighted calibration code for each of the plurality of rank signals, and transmit the weighted calibration codes to the plurality of core dies,
- wherein the DQS calibration circuit is configured to generate an error detection feedback signal based on the threshold voltage code, and
- wherein the DQS generation circuit is configured to correct timing errors of the plurality of data strobe signals based on the error detection feedback signal.

20. The memory device of claim 19, wherein the DQS calibration circuit comprises:
- a sequence detection circuit configured to detect an order of the plurality of rank signals based on phases of the plurality of rank signals and output a rank selection signal;
- a first multiplexer configured to output a selected rank signal that is selected from among the plurality of rank signals based on the rank selection signal;
- a second multiplexer configured to output a first selection strobe signal and a second selection strobe signal that are selected among the plurality of data strobe signals based on a multiplexer selection signal;
- a third multiplexer configured to output one of the first selection strobe signal and a reference strobe signal as a first mode signal based on a mode selection signal;
- a fourth multiplexer configured to output one of the second selection strobe signal and the selected rank signal as a second mode signal based on the mode selection signal;
- a first delay line circuit configured to delay the first mode signal by a first delay amount based on a count value;
- a second delay line circuit configured to delay an output signal of the first delay line circuit by a second delay amount based on an error check signal;
- a replica delay line circuit configured to delay the second mode signal by a delay amount corresponding to a combined delay amount of the first delay amount and the second delay amount;
- a phase detector configured to detect a phase difference between a first output signal of the second delay line circuit and a second output signal of the replica delay line circuit and output a phase detection signal based on the phase difference;
- a calibration control circuit configured to generate the multiplexer selection signal, output the mode selection signal according to an operation mode, and output a first count control signal and a second count control signal based on the phase detection signal;
- a latency detection circuit configured to receive the first count control signal and output the count value or the latency of the selected rank signal based on the first count control signal; and
- an error detection counter configured to generate the error check signal based on the second count control signal and transmit the error detection feedback signal to the DQS generation circuit.

* * * * *